(12) United States Patent
Robertsson

(10) Patent No.: US 8,605,541 B2
(45) Date of Patent: Dec. 10, 2013

(54) THREE-DIMENSIONAL DEGHOSTING

(75) Inventor: Johan Olof Anders Robertsson, Oslo (NO)

(73) Assignee: WesternGeco L.L.C., Houston, TX (US)

( * ) Notice: Subject to any disclaimer, the term of this patent is extended or adjusted under 35 U.S.C. 154(b) by 1357 days.

(21) Appl. No.: 11/629,339

(22) PCT Filed: Jun. 7, 2005

(86) PCT No.: PCT/GB2005/002231
§ 371 (c)(1),
(2), (4) Date: Oct. 10, 2007

(87) PCT Pub. No.: WO2005/121837
PCT Pub. Date: Dec. 22, 2005

(65) Prior Publication Data
US 2008/0165618 A1    Jul. 10, 2008

(30) Foreign Application Priority Data
Jun. 12, 2004   (GB) .................................. 0413151.2

(51) Int. Cl.
*G01V 1/38* (2006.01)

(52) U.S. Cl.
CPC ........................................ *G01V 1/38* (2013.01)
USPC .......................................................... 367/21

(58) Field of Classification Search
USPC .............................. 367/15, 21–24
See application file for complete search history.

(56) References Cited

U.S. PATENT DOCUMENTS

| | | | |
|---|---|---|---|
| 4,618,949 A | 10/1986 | Lister | |
| 4,870,625 A | 9/1989 | Young et al. | |
| 5,475,652 A | 12/1995 | McNeel et al. | |
| 6,021,379 A | * 2/2000 | Duren et al. | 702/16 |
| 6,026,057 A | * 2/2000 | Byun et al. | 367/52 |
| 6,061,302 A | 5/2000 | Brink et al. | |
| 6,101,448 A | 8/2000 | Ikelle et al. | |
| 6,456,565 B1 | 9/2002 | Grall et al. | |
| 6,477,470 B2 | 11/2002 | Fokkema et al. | |
| 6,493,636 B1 | 12/2002 | DeKok | |

(Continued)

FOREIGN PATENT DOCUMENTS

| | | |
|---|---|---|
| GB | 2363459 A | 12/2001 |
| GB | 2363459 B | 12/2001 |

(Continued)

OTHER PUBLICATIONS

Amundsen et al, 'Rough-sea deghosting of streamer seismic data using pressure gradient approximations' Geophysics, vol. 70(1), 2005, pp. V9-V9.

(Continued)

*Primary Examiner* — Krystine Breier

(57) ABSTRACT

The method presented accounts for three-dimensional effects when deghosting marine seismic data. The method relies on having second-order spatial derivatives in the cross-line direction available. The second-order cross-line derivative can be estimated directly or through indirect measurements of other wavefield quantities and by using wave-equation techniques to compute the desired term. The method preferably employs either a multicomponent streamer towed in the vicinity of the sea surface, a twin-streamer configuration near the sea-surface, or a configuration of three streamers that are separated either vertically or horizontally to estimate the second-order vertical derivative of pressure.

17 Claims, 31 Drawing Sheets

(56) References Cited

U.S. PATENT DOCUMENTS

| | | | |
|---|---|---|---|
| 6,512,980 B1 | 1/2003 | Barr | |
| 6,654,694 B2 | 11/2003 | Fokkema et al. | |
| 6,747,913 B2 | 6/2004 | Fokkema et al. | |
| 7,239,577 B2 * | 7/2007 | Tenghamn et al. | 367/15 |
| 2003/0147306 A1 | 8/2003 | Robertsson | |
| 2004/0042341 A1 | 3/2004 | Tenghamn et al. | |
| 2004/0068373 A1 | 4/2004 | Goujon et al. | |
| 2006/0074562 A1 | 4/2006 | Amundsen et al. | |

FOREIGN PATENT DOCUMENTS

| | | | |
|---|---|---|---|
| GB | 2389183 | | 12/2003 |
| GB | 2405473 | | 3/2005 |
| WO | WO 0057207 | * | 9/2000 |
| WO | WO 0057207 A1 | * | 9/2000 |
| WO | 02/01254 A1 | | 1/2002 |
| WO | WO 03100461 A2 | * | 12/2003 |

OTHER PUBLICATIONS

Robertsson & Kragh 'Rough sea deghosting using a single streamer and a pressure gradient approximation' Geophysics, vol. 67(6) ,2002,pp. 2005-2011.

Roesten et al 'Rough-sea deghosting using vertical particle velocity field approximations' $64^{th}$ EAGE Conference Florence, 2002, pp. 1-4.

Roesten et al 'Optimal non-recursive and recursive spatial filters for de-multiple of OBS data' $72^{th}$ Annual Society of Exploration Geophysicists (SEG) Meeting, Salt Lake City, 2002.

* cited by examiner

THREE-DIMENSIONAL DEGHOSTING

CROSS-REFERENCE TO RELATED APPLICATIONS

This application claims the benefits of priority from:
i) Application Number 0413151.2, entitled "THREE-DIMENSIONAL DEGHOSTING," filed in the United Kingdom on Jun. 12, 2004; and
ii) Application Number PCT/GB2005/002231, entitled "THREE-DIMENSIONAL DEGHOSTING," filed under the PCT on Jun. 7, 2005;
All of which are commonly assigned to assignee of the present invention and hereby incorporated by reference in their entirety.

The present invention relates to acoustic wavefield decomposition, or "deghosting," of acquired marine seismic data, and more particularly to the accounting of three-dimensional effects during deghosting.

BACKGROUND OF THE INVENTION

FIG. 1 is a schematic diagram of a marine seismic survey in which seismic energy is emitted from a towed source 1 (e.g., an array of air gun strings) and detected by towed sensors (e.g., twin arrays 2, 2' of streamers separated by a distance d, and each having multiple hydrophones $S_1$, $S_2$, ... $S_N$, and being suspended beneath floats/buoys 8) at a depth h below the surface 6 of a body of water. The source 1 imparts an acoustic wave to the water, creating a wavefield which travels coherently into the earth underlying the water. As the wavefield strikes interfaces 4 between earth formations, or strata, it is reflected back through the earth and water along a path 5 to the sensors, where it is converted to electrical signals and recorded.

In other marine survey methods, the sensors and/or sources are placed at or close to the seabed 3 or in wells (also called wellbores or boreholes) penetrating the earth formations. Through analysis of these detected signals, it is possible to determine the shape, position and lithology of the sub-sea formations.

A problem encountered in marine surveying, as well as in inverse vertical seismic profiling or "VSP," is that of water column reverberation. The problem, which arises as a result of the inherent reflectivity of the water surface and bed (as well as sub-sea boundaries), may be explained as follows. A seismic wave reflected from seabed or sub-sea earth strata passes into the water in a generally upward direction. This wave, termed the "primary," travels through the water and past the seismic sensors—whether on the seabed or in a towed array—which record its presence (i.e., characteristics of the primary). The wavefield continues upwardly, e.g., along path 7, to the water's surface, where it is reflected back downwardly. This reflected, or "ghost," wavefield also travels through the water and past the sensor(s) where it is again recorded. Depending upon the nature of the earth material at the water's bottom, the ghost wavefield may itself be reflected upwardly through the water, giving rise to a series of one or more subsequent ghost reflections or "multiples."

In instances where the earth material at the seabed is particularly hard, excess acoustic energy or noise generated by the seismic source can also become trapped in the water column, reverberating in the same manner as the reflected seismic waves themselves. This noise is often high in amplitude and, as a result, tends to cover the weaker seismic reflection signals sought for study. This reverberation of the seismic wavefield in the water obscures seismic data, amplifying certain frequencies and attenuating others, thereby making it difficult to analyze the underlying earth formations. Deghosting, or removal of the ghost wavefield(s), is therefore important for accurate characterization of earth formations. Those skilled in the relevant art will appreciate that deghosting alone does not entirely solve the multiple problem (although other known methods address multiples), since every multiple will have an up-going part as well as a down-going part (its ghost).

In most of the deghosting solutions proposed to date (e.g.: Robertsson, J. O. A., Kragh, J. E., and Martin, J., 1999, Method and system for reducing the effects of the sea surface ghost contamination in seismic data, GB Patent No. 2,363, 459; Robertsson, J. O. A., and Kragh, J. E., 2002, Rough sea deghosting using a single streamer and a pressure gradient approximation, Geophysics, 67, 2005-2011; and Robertsson, J. O. A., Amundsen, L., Roesten, T., and Kragh, J. E., 2003, Rough-sea deghosting of seismic data using vertical particle velocity approximations, International Patent Application No. PCT/GB2003/002305, filed on 27 May 2003), three-dimensional ("3D") effects are ignored. Data are assumed to be acquired with a source event, or "shot," occurring in-line with a streamer, or otherwise to be pre-processed to satisfy this criterion.

However, in reality, 3D effects may be significant for several different reasons:
1. the acquisition geometry is 3D with significant cross-line offsets between some of the streamers and the source(s);
2. a 2D approach assumes cylindrical spreading of a wavefront in space, whereas in 3D it is assumed to be spherical;
3. the sea surface has a 3D structure causing scattering out-of-plane; and
4. there may be significant cross-line variation in the subsurface causing out-of-plane reflections and scattering.

In a "2D" approach such as the ones proposed in the past, we can successfully deal with reasons 1 and 2 above. In fact, with respect to reason 1, a compact deghosting filter (see, e.g., Robertsson and Kragh, 2002; Robertsson et al., 2003; and Roesten, T., Amundsen, L., Robertsson, J. O. A., and Kragh, E., Rough-sea deghosting using vertical particle velocity field approximations, 64th EAGE Conference Florens, 2002; or Amundsen, L., Roesten, T., Robertsson, J. O. A., and Kragh, E., On rough-sea deghosting of single streamer seismic data using pressure gradient approximations, submitted to Geophysics, 2003.) is ideally suited to project the actual plane of propagation onto the vertical plane containing the locations of the streamer data recordings without requiring irregularly spaced processing. Robertsson and Kragh (2002) showed how to compensate for reason 2 and concluded that the error made by assuming cylindrical spreading mostly is negligible. The two last items on the list (3 and 4) cannot be addressed using the "2D" approaches. Of these, the third item on the list, the 3D structure of the rough sea surface, is likely less important than the fourth item. Being able to properly account for wave propagation out-of plane is critical in areas with complex imaging tasks (salt, fault blocks, etc.) or multiple problems (e.g., diffracted multiples).

A need therefore exists for a solution to these shortcomings associated with 2D approaches.

The largest error term related to 3D effects in known 2D deghosting techniques (e.g., Robertsson and Krag, 2002; Robertsson et al., 2003; Amundsen et al., 2003) corresponds to a second-order cross-line spatial derivative of pressure. This could be implemented using a 3-point filter if data were acquired with three conventional streamers side-by-side spaced within a fraction of the Nyquist wavenumber (a few meters apart). For operational reasons, this is difficult achieve.

A need therefore exists for practical methods and/or apparatus that account for 3D effects when deghosting marine seismic data.

DEFINITIONS

Reference is made throughout this application to a towed marine seismic survey, where one or several streamers are towed behind a vessel with one or several sources. We will be referring to the in-line direction as the direction in the horizontal plane parallel to the streamer(s). A Cartesian coordinate system will also be used where the in-line direction is referred to as the x-direction. Conversely, we will be referring to the cross-line direction as the direction in the horizontal plane perpendicular to the streamer(s). In the Cartesian coordinate system, the cross-line direction is referred to as the y-direction.

The term "multicomponent" refers to the use of one or more geophones (preferably three orthogonal geophones to compensate for the directional sensitivity) to detect particle velocity signal(s) in combination with a hydrophone to detects a pressure gradient signal. An example of a commercial multicomponent system designed for ocean-bottom (also known as seabed) applications is WesternGeco's Q-Seabed™ system.

SUMMARY OF THE INVENTION

The present invention relates to methods that account for 3D effects when deghosting marine seismic data. These methods rely on having second-order spatial derivatives in the cross-line direction available. These derivatives can be measured explicitly (e.g., by having three streamers very close and parallel to each other in the horizontal plane), but more preferably it is proposed to estimate the second-order cross-line derivative through indirect measurements of other wavefield quantities and use wave-equation techniques to compute the desired term.

The inventive method preferably employs either a multicomponent streamer towed in the vicinity of the sea surface, a twin-streamer configuration near the sea-surface, or a configuration of three streamers vertically above each other towed at any depth away from the sea surface.

For the case of the three streamers, the second-order cross-line derivative of pressure is either measured explicitly or estimated by using the wave equation.

For the case of the twin-streamer configuration, the second-order cross-line derivative of pressure is estimated by using the wave equation.

For the case of the multicomponent streamer or alternatively for the twin-streamer configuration, the second-order cross-line derivative of pressure is achieved by calibrating an estimate of the vertical component of particle velocity from single streamer pressure data only—which assumes wave propagation in-line with the streamer (Robertsson and Kragh, 2002; Amundsen et al., 2003)—against either an explicit measure of the vertical component of particle velocity where no 2D assumption of course exists or estimates of vertical component of particle velocity using a twin streamer configuration.

In accordance with another aspect of the present invention, seismic wavefield data is acquired using a multicomponent sensor cable within a fluid medium. The multicomponent sensor cable may by a streamer towed in the vicinity of the surface of the fluid medium, or it may be an ocean-bottom cable coupled to the bed of the fluid medium. In the case of the streamer (mentioned elsewhere herein), the multicomponent sensor cable is preferably towed beneath the surface of the fluid medium at a depth lying in the range of 4-50 meters.

BRIEF DESCRIPTION OF THE DRAWINGS

So that the above recited features and advantages of the present invention can be understood in detail, a more particular description of the invention, briefly summarized above, may be had by reference to the embodiments thereof that are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE INVENTION

3D Effects and Basic Notation

Figure 1:
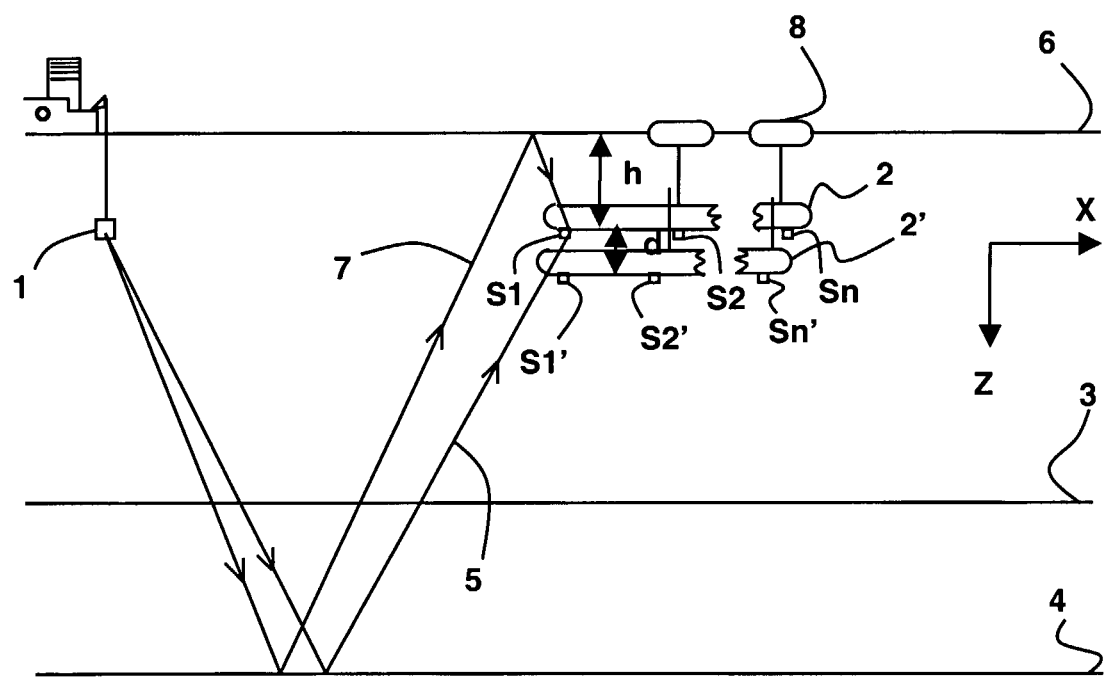
FIG. 1 is a schematic representation of a marine seismic survey being conducted in accordance with one aspect of the present invention.

The present invention derives expressions for approximate deghosting in 3D using either:
- a configuration of three streamers side-by-side spaced within a fraction of the Nyquist wavenumber (a few meters apart) to explicitly measure the second-order cross-line derivative of pressure;
- a configuration of three streamers vertically above each other towed at any depth away from the sea surface;
- a multicomponent streamer; or
- twin streamers (i.e., over/under pair).

The three streamers could be towed in a vertically-separated configuration at any depth to estimate the second-order cross-line derivative of pressure implicitly by using the wave equation. In using both the multicomponent and twin streamer configurations, it is preferred that these configurations be towed in the vicinity of the sea surface, as they make use of the proximity of the sea surface to estimate the desired second-order cross-line spatial derivative of pressure.

Acoustic Wavefield Decomposition

Acoustic wavefield decomposition (or deghosting) can either be carried out so that the resulting quantities represent up- and down-going components of vertical particle velocity or pressure. We observe that if we compute up-going vertical component of particle velocity instead of pressure we obtain a number of advantages. The most important point is that the spatial filter acts on pressure recordings and not vertical component of particle velocity. It is this filter that we are trying to implement a 3D approximation of and in the following sections we shall see that this can be accomplished thanks to the fact that filter operates on pressure. Note that following deghosting of the vertical component of particle velocity, the conversion back to the pressure equivalent is more or less trivial since we are only dealing with up-going waves. The conversion is a simple scaling with a constant divided by the cosine of the arrival angle and can be easily implemented in the fk-domain.

Other (less important) advantages of deghosting vertical component of particle velocity include:
- seismic interference noise should be greatly reduced as this largely does not project onto the vertical component of particle velocity; and
- the spatial filter in the acoustic decomposition contains a zero instead of a pole and is therefore simpler to implement.

The following equation is used to decompose the data (in the frequency-wavenumber domain):

$$V_z^U = \frac{1}{2}\left(V_z - \frac{k_z}{\rho\omega}P\right), \quad [1]$$

where $V_z^U$ is the desired (deghosted) up-going part of the vertical component of particle velocity (capital letters denote wavenumber-frequency domain expressions), $V_z$ is the vertical component of particle velocity, P is the pressure, $k_z$ is the absolute value of the vertical wave number, $\omega$ is the angular frequency and $\rho$ is the density of water.

An approximation to equation (1) has been proposed by assuming that $k_x=0$ (vertical incidence approximation), such that equation (1) reduces to:

$$v_z^U \approx \frac{1}{2}\left(v_z - \frac{1}{\rho c}p\right), \quad [2]$$

where c is the water velocity, and lower case letters represent space-frequency domain expressions of pressure and particle velocities. This will be referred to as the "vertical incidence approximation" and has been shown to be unsatisfactory for accurate deghosting.

Equation (1) can be implemented very accurately as a spatial filter along each streamer. However, the implementation of equation (1) assumes that waves are only propagating in the 2D plane and are not arriving with a component in the cross-line direction. By ignoring such 3D aspects, we are introducing the "vertical incidence approximation" in the cross-line direction.

One way of estimating the vertical wavenumber is to compute a spatially compact filter in terms of horizontal wavenumbers to approximate $k_z(\omega, k_x, k_y) = \sqrt{(\omega/c)^2 - k_x^2 - k_y^2}$ (e.g., Amundsen and Ikelle, 1998; Roesten et al. 2002). The simplest spatially compact approximation to the horizontal wavenumber is a Taylor expansion around zero wavenumbers (valid for $k_x^2 + k_y^2 < (\omega/c)^2$). Here we shall rewrite the expression for the vertical wavenumber and expand it in the $k_y$ direction only since the filter can be implemented very accurately in the in-line direction (i.e., x-direction) already:

$$k_z(\omega, k_x, k_y) \approx \sqrt{(\omega/c)^2 - k_x^2}\left(1 - \frac{k_y^2}{2((\omega/c)^2 - k_x^2)} + O(k_y^4)\right). \quad [3]$$

As mentioned above, equation (3) lends itself to be implemented as spatially compact filters. This is because each power of horizontal wavenumber $k_y$ corresponds to a horizontal derivative of the same order as the power of the wavenumber. However, we are not necessarily limited to Taylor approximation of the vertical wavenumber expressions. Other more sophisticated approximations that also result in compact filters and may give better results are described by Roesten et al. (2002). Our experience for compact filters is that for 3-point filters, the lowest order Taylor approximation is hard to improve upon.

Equation (3) contains two terms. The first term is identical to the exact 2D approximation and therefore contains no $k_y$ factors. The second term contains a factor $k_y^2$ which requires us to measure or estimate the second-order spatial derivative or pressure in the cross-line direction.

Figure 2:
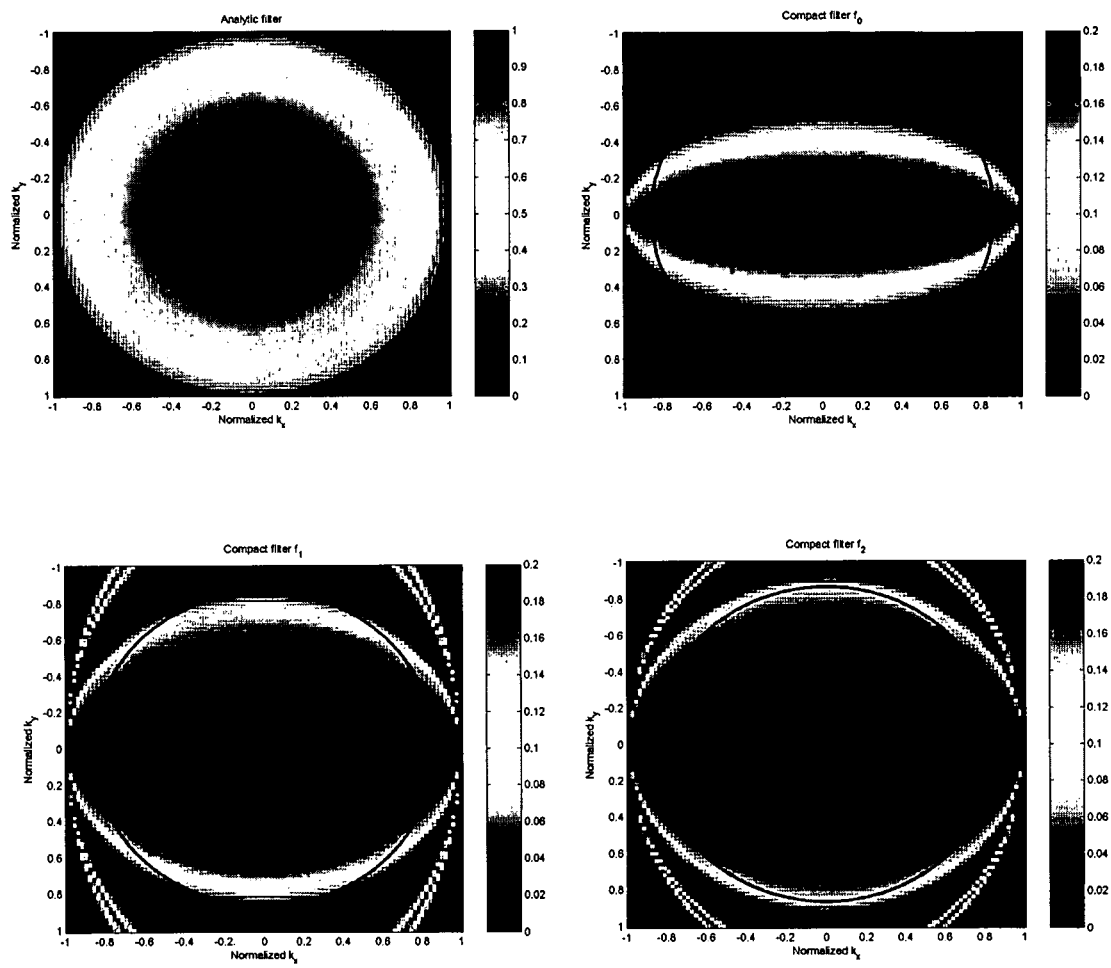
FIG. 2 shows plots of an analytical 3D de-ghosting filter, as well as error plots comparing three different compact filter approximations to the analytical filter.

Let us examine how good a filter approximation to equation (1) that we can achieve by using equation (3) [provided that we know the second-order derivative in the cross-line direction]. The upper left panel of FIG. 2 shows plots of the analytical filter $k_z = \sqrt{(\omega/c)^2 - k_x^2 - k_y^2}$, and the other panels show error plots of how well the three different compact filter approximations compare to the analytical filter. The upper right panel depicts the error (compared to analytical filter) in the lowest order approximation (the exact 2D approximation) that does not contain any factors of $k_y$. The bottom left panel depicts the next higher order approximation including a factor $k_y^2$. The bottom right panel depicts the second higher approximation including a factor $k_y^4$ [not included in equation (3)]. The black circle indicates 60 degrees incidence angle from vertical. The error plots were obtained by plotting the difference in the filter approximation compared to the true solution and normalizing with respect to the true solution. The error plots have been saturated when the error is greater than 20%. The region within the black circle corresponds to energy incident with an angle less than 60 degrees compared to the vertical. From FIG. 2, it is clear that by including one higher-order term with the $k_y^2$ factor, a much better approximation to the filter in the cross-line direction is obtained.

Multicomponent Sensor Cables

Robertsson and Kragh (2002) proposed a single streamer deghosting method based on estimating the vertical component of particle velocity from a conventional streamer recording pressure towed in the vicinity of the sea surface:

$$\frac{\partial p}{\partial z} = \frac{p}{h} - \frac{h}{2}k^2 p - \frac{h}{2}\left(\frac{\partial^2 p}{\partial x^2} + \frac{\partial^2 p}{\partial y^2}\right) + O(h^2), \quad [4]$$

[equation (4) in Robertsson and Kragh, 2002], where lower case now denotes space-frequency domain expressions so that p is the pressure, k=ω/c, h is the instantaneous waveheight at each hydrophone location as a function of time (needs to be implemented in the time domain), and $O(h^2)$ denote the greatest error term in the expansion. Amundsen et al. (2003) proposed a similar method which is accurate for slightly greater streamer depths:

$$\frac{\partial p}{\partial z} = k\cot(kh)p - \frac{h}{3}\left[1 + \frac{2}{15}k^2h^2\right]\left(\frac{\partial^2 p}{\partial x^2} + \frac{\partial^2 p}{\partial y^2}\right) + O(h^2). \quad [5]$$

Both methods are usually implemented assuming 2D wave propagation in-line with the streamer so that the second-order cross-line derivatives of pressure are ignored (see Appendix in the paper by Robertsson and Kragh, 2002). By comparing such an estimate of the vertical component of particle velocity with the actual value as recorded in a multi-component streamer, we can estimate the greatest term of the error in the 2D assumption. Here we show how this is done for the method by Amundsen et al. (2003) which gives us the second-order cross-line derivative of pressure that we need for our 3D deghosting approximation. A similar expression could also be derived for the method by Robertsson and Kragh (2002).

This solution is not limited to multicomponent streamer cables, but may be implemented through other multicomponent sensor cables, such as: an ocean-bottom cable (OBC) coupled to the bed of the fluid medium, as well as a multicomponent streamer towed in the vicinity of the surface of the fluid medium. One suitable OBC cable configuration, including in particular a multicomponent sensor housing, is disclosed in U.S. Patent Application Publication 2004/0068373 assigned to WesternGeco. In the case of the streamer (mentioned elsewhere herein), the multicomponent sensor cable is preferably towed beneath the surface of the fluid medium at a depth lying in the range of 4-50 meters. Such streamers are preferably adaptable from known multicomponent streamer solutions, in accordance with the level of ordinary skill in the relevant art. Reference is made in this regard to the following multicomponent streamer solutions: U.S. Pat. No. 6,061,302 assigned to WesternGeco; U.S. Pat. No. 5,475,652 assigned to I/O Exploration Products; U.S. Pat. No. 4,618,949 to Lister; and U.S. Patent Application Publication No. 20040042341 assigned to Petroleum Geo-Services.

In the multicomponent streamer data, the recorded component of vertical particle velocity $v_z$ can be converted to the vertical pressure gradient through the equation of motion:

$$\frac{\partial p}{\partial z} = i\omega\rho v_z. \quad [6]$$

Equation (5) and equation (6) give us the second-order cross-line derivative of pressure as:

$$\frac{\partial^2 p}{\partial y^2} = \frac{3}{1 + \frac{2}{15}k^2h^2}\left[\frac{k\cot(kh)}{h}p - \frac{i\omega\rho}{h}v_z\right] - \frac{\partial^2 p}{\partial x^2} + O(h). \quad [7]$$

Equation (7) is expressed in the space-frequency domain. Because the sea surface evolves with time, equation (7) should be implemented in the space-time domain with a compact filter both in space and time (Amundsen et al., 2003). This can be achieved through series expansion of terms not containing pure factors of k (translate into time derivatives). This will also help to resolve stability problems caused by the fact that the cotangent term goes to infinity at the first ghost notch (outside the valid region of the deghosting operator). In the tests below we substituted the cotangent term in equation (7) against the three first terms in its Taylor expansion $$\frac{k}{h}\cot(kh) = \frac{1}{h^2} - \frac{k^2}{3} - \frac{k^4h^2}{45}.$$

Finally, note that the largest order error term in equation (7) is proportional to the first-power of h. Below we will be testing whether or not this is sufficiently accurate.

Twin Streamer Configuration

As we have seen above, in order to deghost seismic data, that is decompose the data into its up- and down-going constituents, the vertical component of particle velocity must be known. In a multicomponent streamer this is measured directly whereas in the twin streamer configuration (see, e.g., 2, 2' in FIG. 1) it is estimated by filtering the pair of streamer hydrophone data (e.g., Robertsson et al., 2003). This filtering process introduces a second 2D assumption where the largest error in a 2D approximation of the full 3D filter also is a second-order spatial cross-line derivative of pressure.

Robertsson et al. (2003) derive an expression for estimating the vertical component of particle velocity using compact deghosting filters applied to streamer data recorded at multiple depths:

$$V_z(\omega, k_x, k_y, z_1) = \frac{i}{\rho\omega\Delta z}\sum_{m=0}^{\infty}(-1)^m F_m^{(1)}\kappa^{2m}P(\omega, k_x, k_y, z_1) - \frac{i}{\rho\omega\Delta z}\sum_{m=0}^{\infty}(-1)^m F_m^{(2)}\kappa^{2m}P(\omega, k_x, k_y, z_2) \quad [8]$$

In equation (8) $P(\omega, k_x, k_y, z_2)$ and $P(\omega, k_x, k_y, z_1)$ denote the recorded pressure at the deepest and shallowest streamers, respectively, $\rho$ is the density of water, $\Delta z$ is the vertical streamer separation, $\omega$ is the angular frequency, $k_z = \sqrt{k^2 - \kappa^2}$ is the vertical wavenumber, $k = \omega/c$, $c$ is the velocity in water, $\kappa^2 = k_x^2 + k_y^2$, and $k_x$ and $k_y$ are the horizontal wavenumbers. The lowest order coefficients in the expansion in equation (8) are:

$$F_0^{(1)} = k\Delta z \cot(k\Delta z), \qquad [9]$$

$$F_1^{(1)} = \frac{\Delta z}{2k} \frac{d}{d(k\Delta z)} k\Delta z \cot(k\Delta z), \qquad [10]$$

$$F_0^{(2)} = \frac{k\Delta z}{\sin(k\Delta z)}, \qquad [11]$$

and $$F_1^{(2)} = \frac{\Delta z}{k} \frac{\sin(k\Delta z) - k\Delta z \cos(k\Delta z)}{\sin^2(k\Delta z)}, \qquad [12]$$

Only keeping the lowest order terms [equations (9) and (11)] in the series expansions in equation (8) results in an expression that is valid for all streamer separations and that is exact for vertically incident waves only. This is therefore equivalent to what has been known as the "shift & sum" technique used in the early days of twin-streamer deghosting.

The results can be significantly improved by keeping higher order terms in the series expansions. The next higher order approximation will include 4 terms as given by equations (9)-(12). This can be implemented with a 3-point running spatial filter.

Note that equation (8) is exact for 3D. In the remainder of this application we shall not be concerned with what is going on in-line with the streamers. We can use whatever number of terms in expansion (8) that is necessary as high-order spatial filters in the in-line (x) direction is not a problem. Instead we focus on what can be accomplished cross-line. We observe that we could use the 3-point filter mentioned above [coefficients (9)-(12)] if we had a means of measuring or estimating the second derivative of the pressure in the cross-line direction. We are encouraged by this observation as we know that the approximation is very accurate and sufficient for processing in-line data as well.

As we have seen both steps in the deghosting process of twin streamer data (estimating the vertical component of particle velocity and the up/down decomposition combining this estimate with the pressure recordings) result in largest order error terms that contain second-order spatial derivatives in the cross-line direction. In the twin streamer configuration, we prefer the two streamers to be separated vertically within a few meters. In addition, we also prefer that the twin-streamer configuration is located close to the sea surface (e.g., say streamers at 5 m and 8 m below the sea surface). This will give us three vertical levels where we know the pressure (the pressure vanishes at the sea surface) such that we can in principle estimate the second-order vertical derivative of pressure using a finite-difference approximation. The wave equation then tells us how to compute a second derivative of the pressure cross-line (at the location of the upper streamer):

$$\frac{\partial^2 p}{\partial y^2} = \frac{\partial^2 p}{\partial t^2} - \frac{\partial^2 p}{\partial x^2} - \frac{\partial^2 p}{\partial z^2}. \qquad [13]$$

In an alternative embodiment of the twin streamer configuration, the second-order cross-line derivative of pressure is obtained by calibrating equation (8) against equations (4) or (5) for the vertical component of particle velocity, $v_z$, at the upper streamer (at depth $z_1$). This results in one equation but two unknowns, namely the second-order cross-line derivative of pressure at both the upper and the lower streamer locations (at depths $z_1$, $z_2$). However, a second equation with the same two unknowns can be obtained by repeating the calibration of equation (8) against equations (4) or (5), but this time for $v_z$ at the lower streamer (at $z_2$). We are therefore using the acquisition configuration of solutions 2 (twin streamer) but the processing methods of solution 1 (multicomponent streamer), i.e. are not making use of equation (13).

Synthetic Data

In order to assess the 3D deghosting techniques described in this application, it is actually sufficient to use 2D synthetics. We will assume that we have simulated data in a 2D plane perpendicular to the streamers and that the deghosting has worked perfectly in the in-line direction. Different receiver locations with respect to the source in the 2D synthetics will therefore tell us about how well the 3D deghosting will work for different incidence angles in the cross-line direction. The only part of the deghosting technique not being fully assessed is the subtraction of the term containing the second-order in-line derivative of pressure $\partial^2 p/\partial x^2$ in equations (7) and (13) which we assume to be perfectly estimated. This is not a significant limitation of the tests since this term can be computed with almost as high precision as the time derivative in the same expression. As we shall see the most inaccurate term in equation (13) is the second-order derivative in the vertical direction. As for equation (7) the inaccuracy is introduced because the expression is only accurate to the first-order with respect to the streamer depth below the surface h. Synthetic data were generated using the 2D finite-difference (FD) code by Robertsson et al. (1994). This code allows for simulating the effects of a rough sea surface (Robertsson, 1996). In the main part of the application we use synthetics from two sets of simulations carried out using a model consisting of one homogeneous water layer. In the first simulation absorbing boundaries were used on all edges of the model so that these data will only contain waves propagating in one direction away from the source location (our reference data representing "perfect" deghosting). In the second simulation, the top of the model was bounded by a flat sea surface. Towards the end of the application we also use synthetics generated in the presence of a rough sea surface with a 4 m significant wave height (SWH).

A 50 Hz Ricker wavelet point source located 150 m below the sea surface was used in all simulations.

Twin Streamer Synthetics

In this application we will consider two different twin-streamer configurations:

Configuration 1 with the shallow streamer 3 m below the sea surface and the deeper streamer vertically below at 6 m below the sea surface; and Configuration 2 with the shallow streamer 6 m below the sea surface and the deeper streamer vertically below at 9 m below the sea surface.

Pressure data were recorded along each streamer sampled at 3.125 m. The horizontal extent of the recordings was +/−1500 m relative to the horizontal position of the source (at x=1860 m in the plots in this application).

Multicomponent Streamer Synthetics

Pressure and vertical component of particle velocity data sampled at 3.125 m were recorded at streamers at 4 m and 6 m depth below the sea surface. The horizontal extent of the recordings was +/−1500 m relative to the horizontal position of the source (at x=1860 m in the plots in this application).

Figure 3:
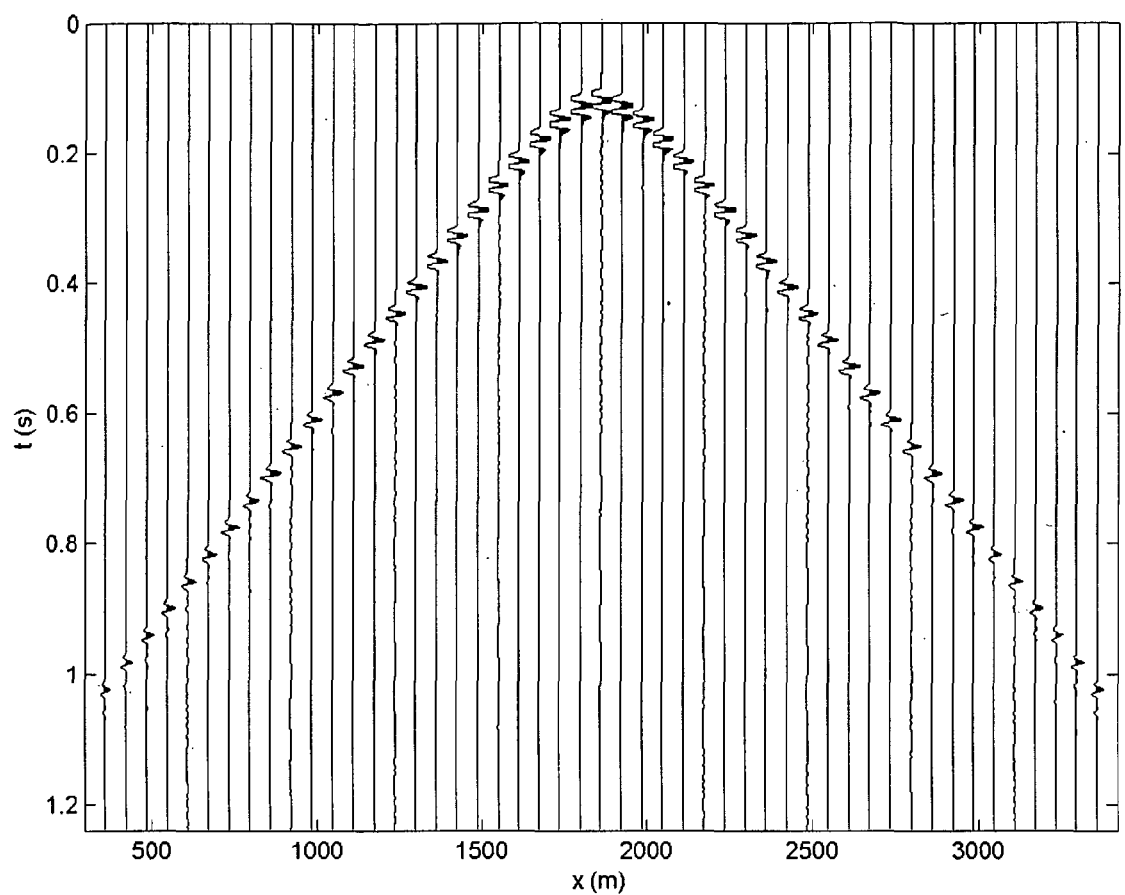
FIG. 3 is an example of a synthetic data plot representing the vertical component of particle velocity that was generated using 2D finite-difference modeling.
Figure 4:
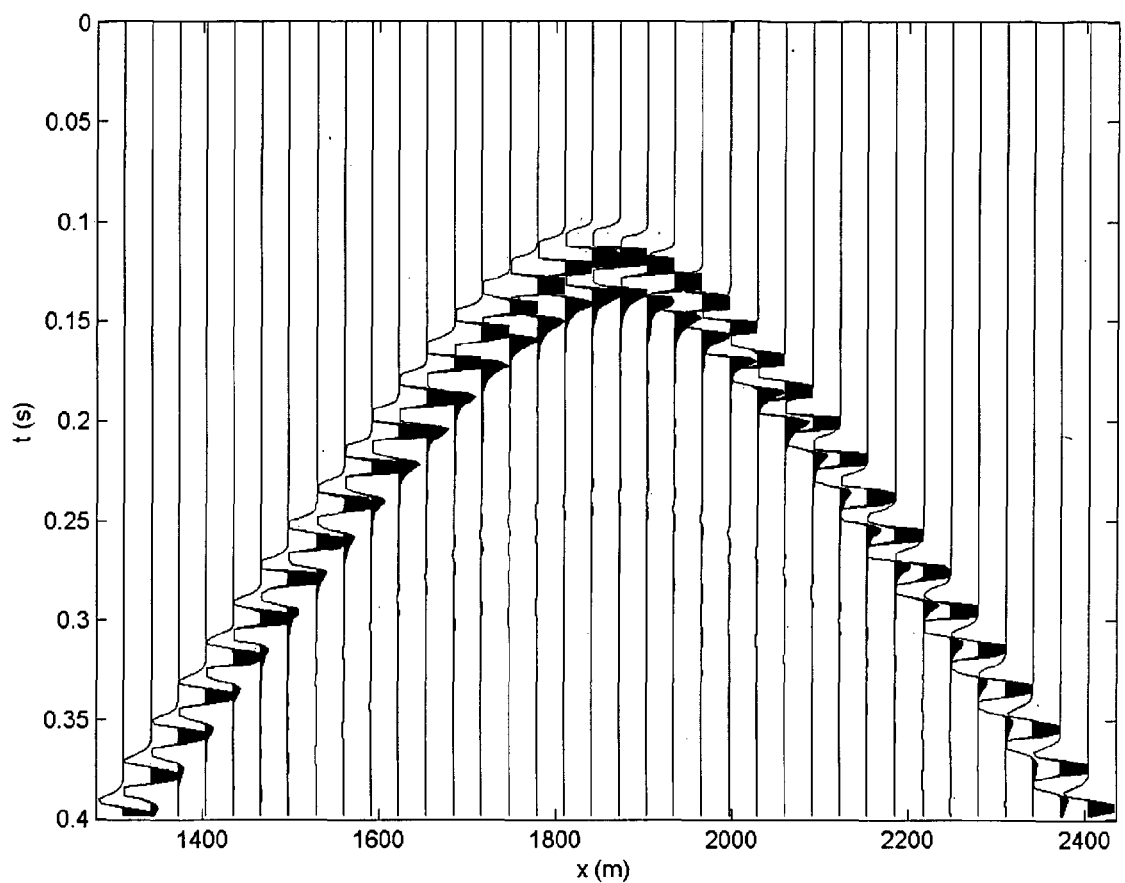
FIG. 4 shows a detailed portion of the plot of FIG. 3, focusing on a particular data window.

Examples of the synthetic data (vertical component of particle velocity) are shown in FIGS. 3 and 4. FIG. 3 depicts the vertical component of particle velocity recorded in the FD simulation. FIG. 4 is a "zoom-in" on a data window of interest in FIG. 3, and shows the particular window of the data that we focus on in this application (both for the twin streamer and multicomponent streamer case). Note the slight reflection from the lower absorbing boundary following the direct arrival.

Results: Twin Streamer Solution

Both methods that we propose for 3D deghosting rely on estimating the second-order spatial cross-line derivative of pressure that is needed for equation (3). As we have seen above the twin streamer solution also needs the second-order spatial cross-line derivative of pressure to estimate the vertical component of particle velocity [equations (8)-(12)]. We first check what is the very best we can do for the twin streamer solution by calculating the second-order horizontal derivative directly from the synthetics instead of estimating it. This will serve as our benchmark solution of how well we can do when assessing the deghosting results.

Figure 5:
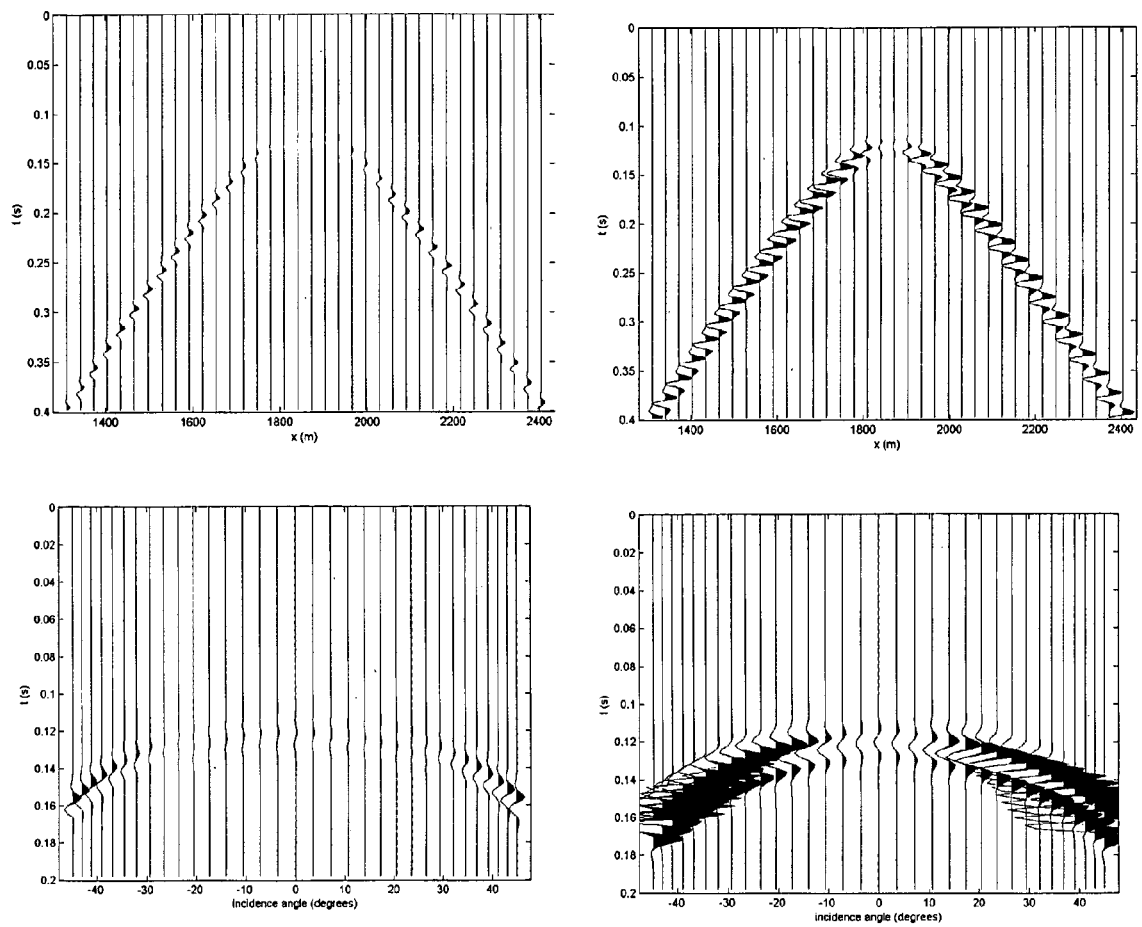
FIG. 5 shows plotted differences between benchmark solutions for 3D deghosting using the twin streamer solution according to the present invention (configuration 1) and a true up-going vertical particle velocity.

Recall that we had two twin streamer configurations to be assessed. In configuration 1 the shallow streamer is 3 m below the sea surface and the deeper streamer vertically below at 6 m below the sea surface. In configuration 2 the shallow streamer is 6 m below the sea surface and the deeper streamer vertically below at 9 m below the sea surface. FIG. 5 shows the benchmark deghosting results using twin streamer configuration 1 in terms of differences between deghosted data and the true up-going vertical component of particle velocity. In the benchmark solution we make use of the second-order horizontal derivative of pressure computed directly in the FD simulation (the best that we could possibly do). The left-hand column in FIG. 5 shows the results using the 3D deghosting solution presented in this application (i.e., equations (1) and (3)). The bottom left panel is a zoom in on the top left panel. The right-hand column in FIG. 5 shows the results using the "vertical incidence approximation" of equation (2), with the bottom right panel being a zoom-in on the top-right panel. This is what we implicitly achieve in the cross-line direction when applying 2D deghosting in-line. The results therefore represent the error in the cross-line direction when using a 2D deghosting solution.

Figure 6:
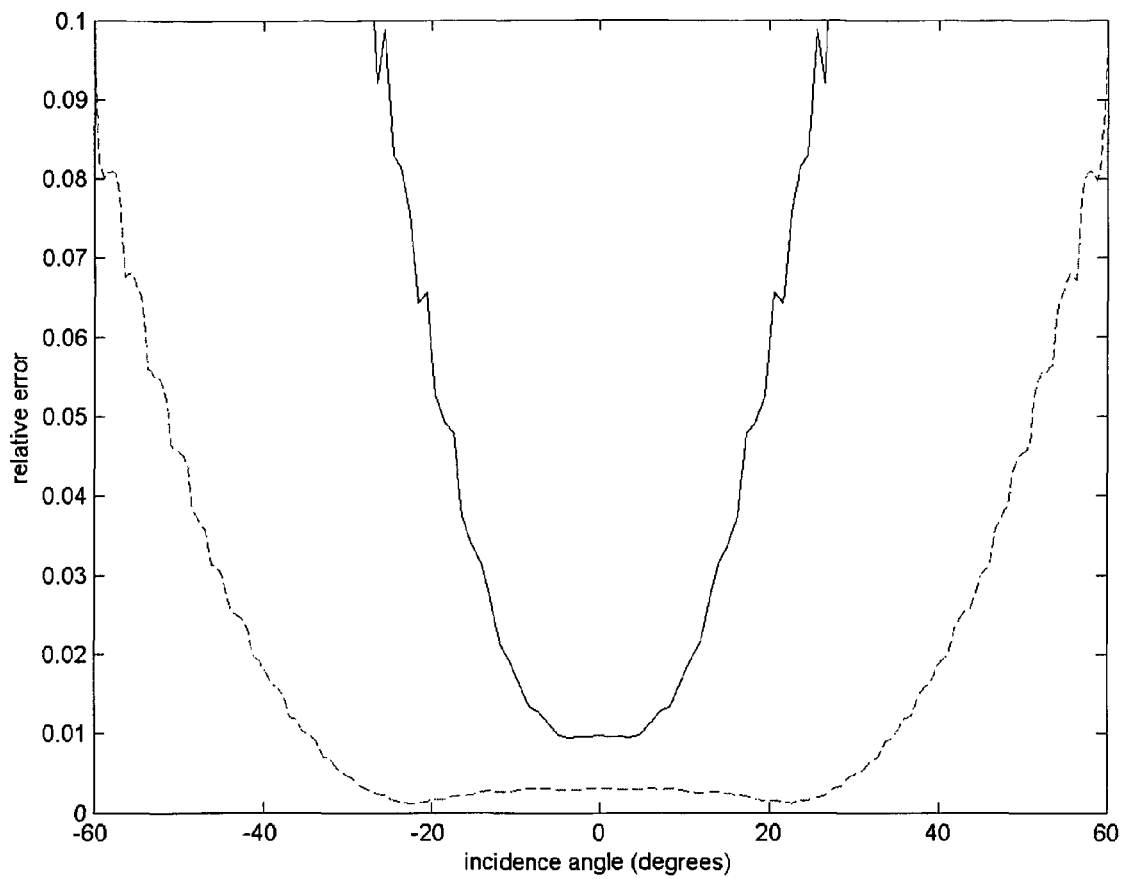
FIG. 6 shows plotted maximums of each trace in the two bottom panels of FIG. 5 normalized by the maximum of the true up-going vertical component of particle velocity.

In FIG. 6 we have plotted the maximum of each trace in the two bottom panels of FIG. 5 normalized by the maximum of the true up-going vertical component of particle velocity. This plot therefore represents the error of the deghosting as a function of incidence angle. The solid curve represents the 2D deghosting results derived from the "vertical incidence approximation" in equation (2), whereas the dashed curve represents the 3D deghosting results derived from deghosting using equations (1) and (3). We note that we have increased the region of successful deghosting significantly by introducing the 3D solution. A 1.5% relative error is reached already at 10 degrees incidence angle for 2D deghosting whereas it is reached at 40 degrees incidence angle for the 3D deghosting solution.

Figure 7:
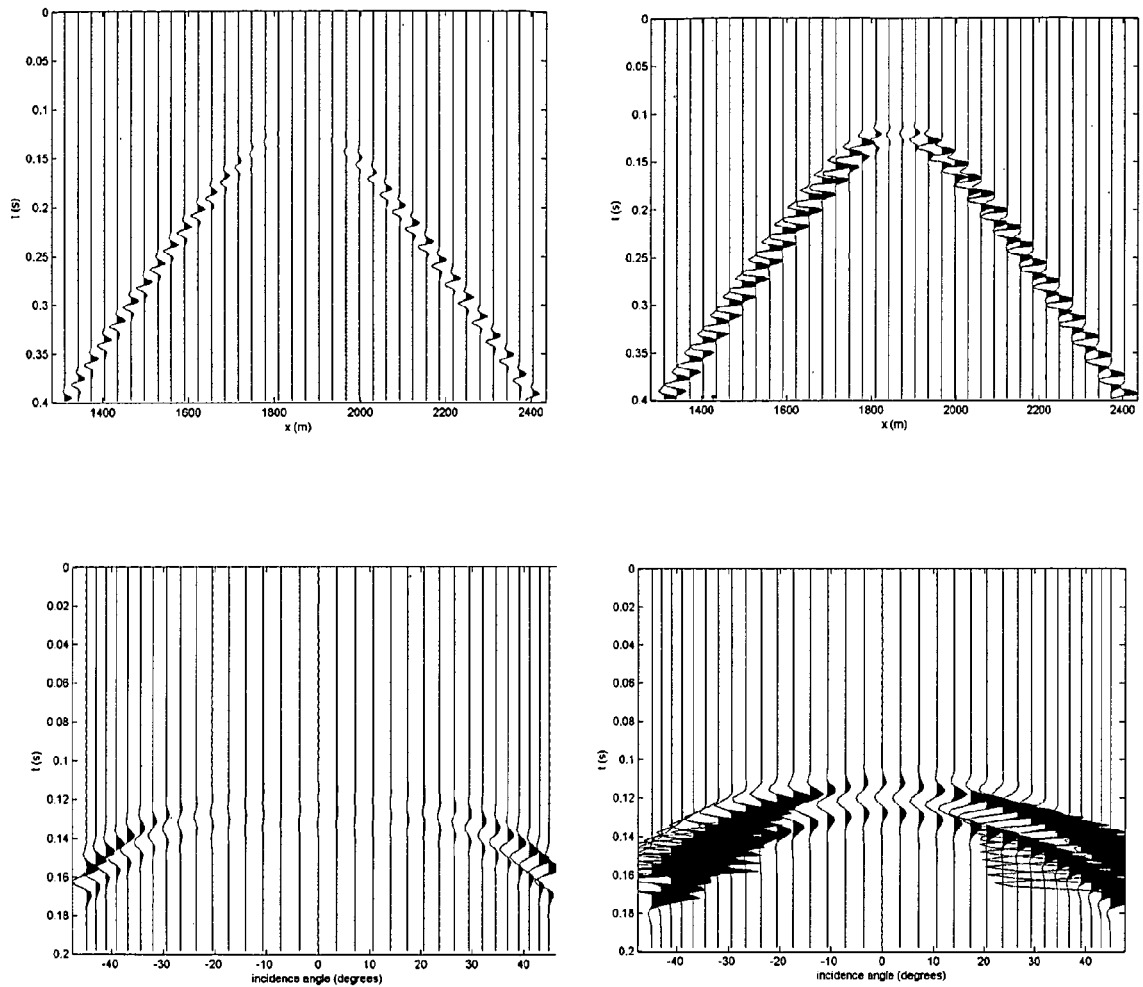
FIGS. 7 and 8 show the same results as FIGS. 5 and 6 but for a different twin streamer (configuration 2).
Figure 8:
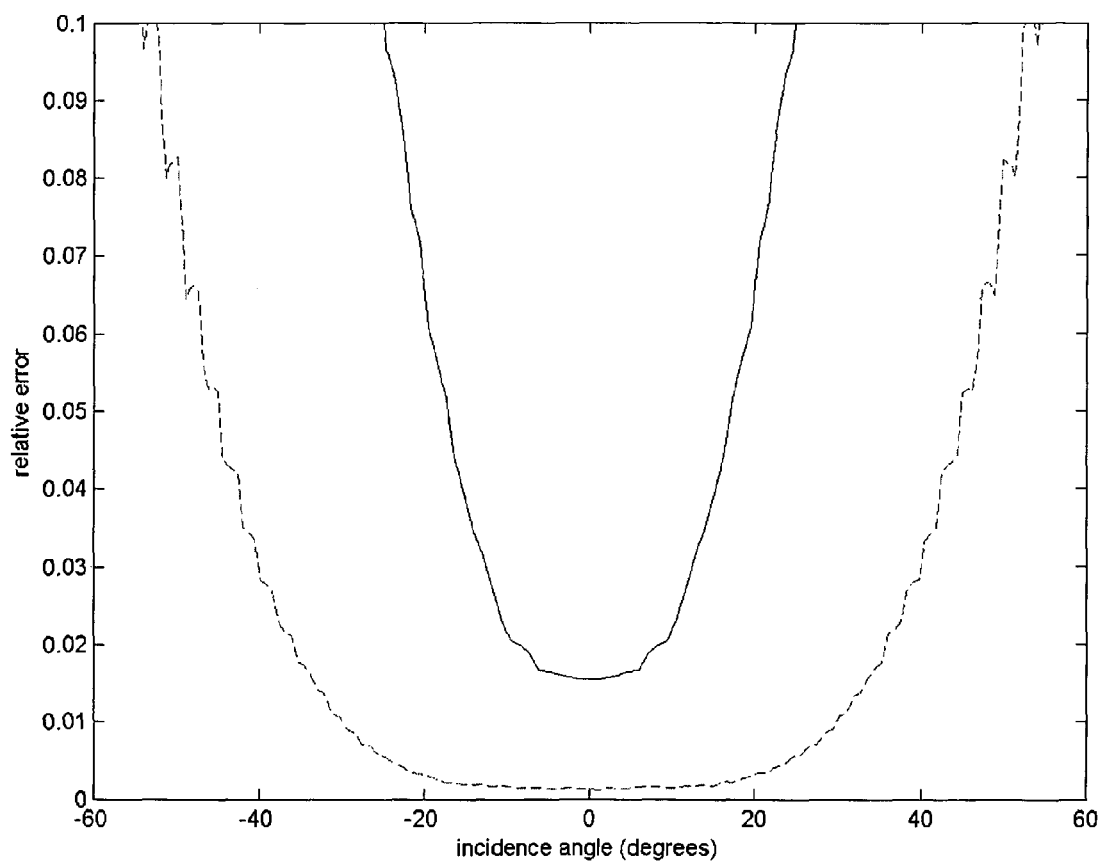

FIGS. 7 and 8 show the same results as FIGS. 5 and 6 but for twin streamer configuration 2 (streamers at 6 m and 9 m below the sea surface). Thus, FIG. 7 depicts a benchmark solution for 3D deghosting using the twin streamer solution (configuration 2). In the benchmark solution we make use of the second-order horizontal derivative of pressure computed directly in the FD simulation (the best that we could possibly do). All four panels reflect the differences between deghosted data and the true up-going vertical particle velocity. The top left panel depicts "3D" deghosting using equations (1) and (3), while the top right panel depicts "2D" deghosting using the "vertical incidence approximation" in equation (2). The bottom left and bottom right panels are zoom-ins of the respective top-left and top-right panels. In FIG. 8, both curves show the (normalized) maximum of the differences between deghosted data and the true up-going vertical particle velocity for each trace. The solid line depicts deghosting using the "vertical incidence approximation" in equation (2). The dashed line depicts deghosting using equations (1) and (3). For this configuration, we note that we have increased the region of successful deghosting significantly by introducing the 3D solution. Overall the results for configurations 1 and 2 do not differ significantly.

FIGS. 9, 10, 11 and 12 show analogous results to those shown in FIGS. 5, 6, 7 and 8 but this time around we have used equation (13) to estimate the second-order horizontal derivative. These results do not look as encouraging as those in the benchmark solution (FIGS. 5-8) when we used the value for the second-order horizontal derivative computed directly in the FD simulation and would not provide a sufficiently accurate result for 3D deghosting.

The second-order horizontal derivative of pressure is used in three places during the deghosting process. First it is needed both at the shallow and deeper streamers when estimating the vertical component of particle velocity [equations (8)-(12)]. It is also needed at the shallow streamer location when carrying out the up/down separation using equation (3). Equation (13) can be used to accurately compute the second-order horizontal derivative at the shallower streamer location. However, at the deeper streamer location the estimate will not be as accurate since we cannot use a centered finite-difference estimate of the second-order vertical derivative (this would require yet another streamer below). Instead we used a one-sided less accurate FD approximation to compute the second-order vertical derivative in the deghosting results in FIGS. 9-12. Through a number of tests we found that it is this approximation that reduces the accuracy of the 3D deghosting.

Figure 9:
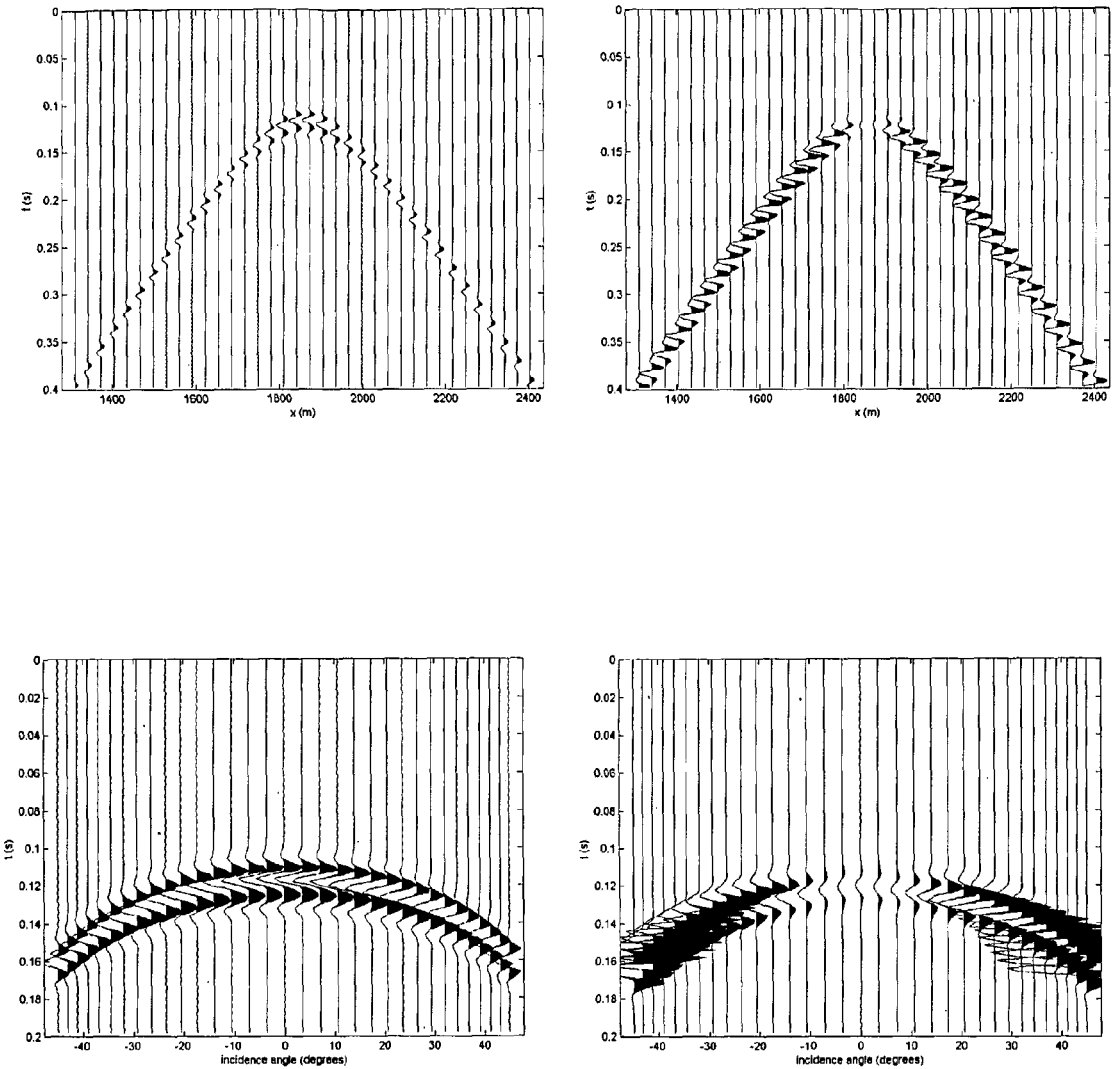
FIGS. 9, 10, 11 and 12 show analogous results to those shown in FIGS. 5, 6, 7 and 8, but using the wave equation to estimate the second-order horizontal derivative.
Figure 10:
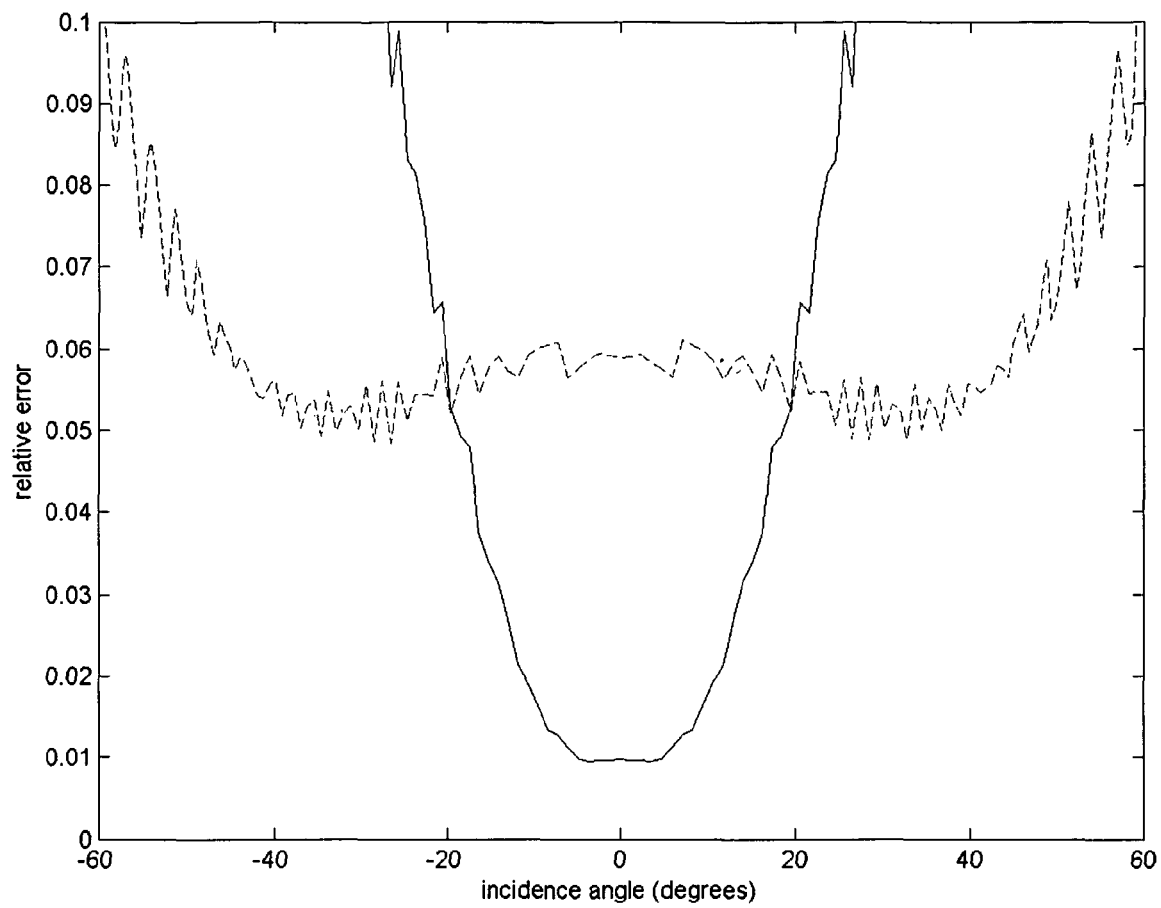
Figure 11:
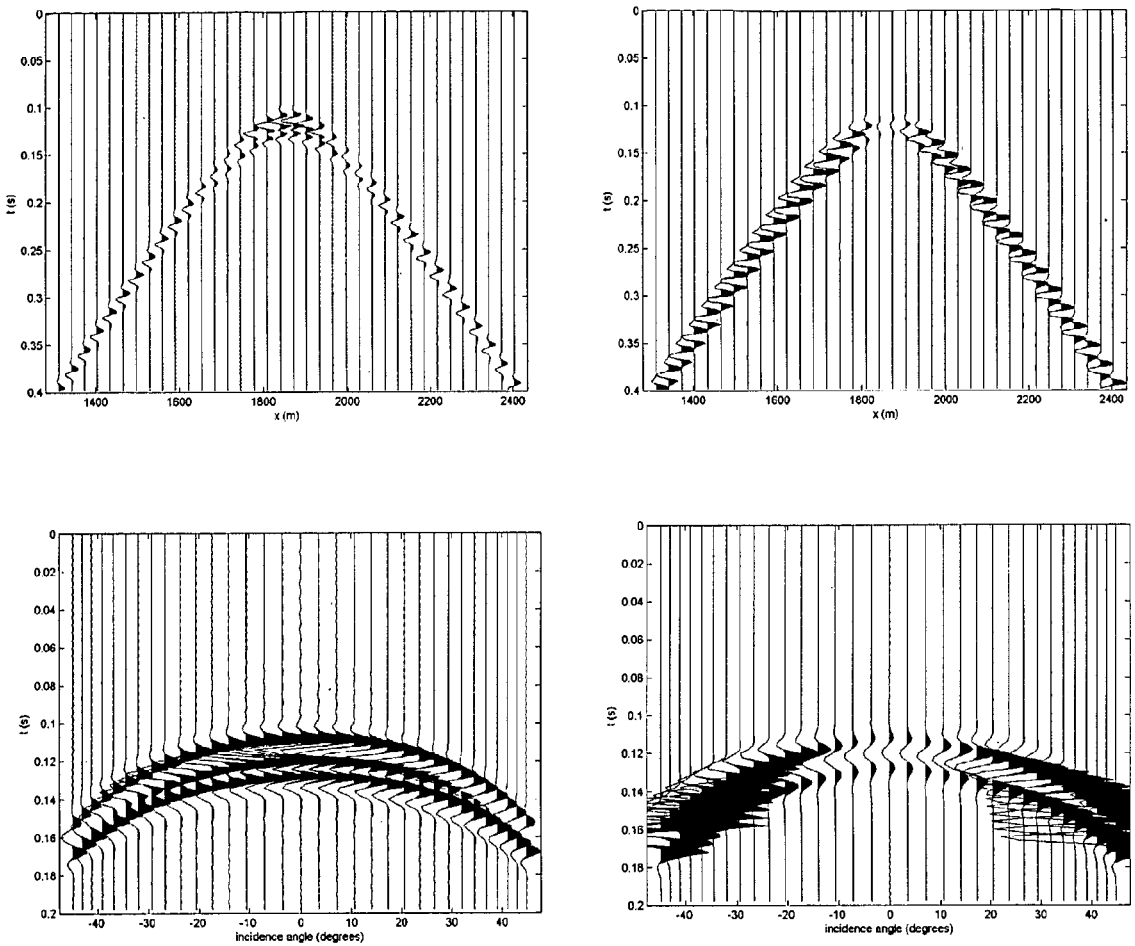
Figure 12:
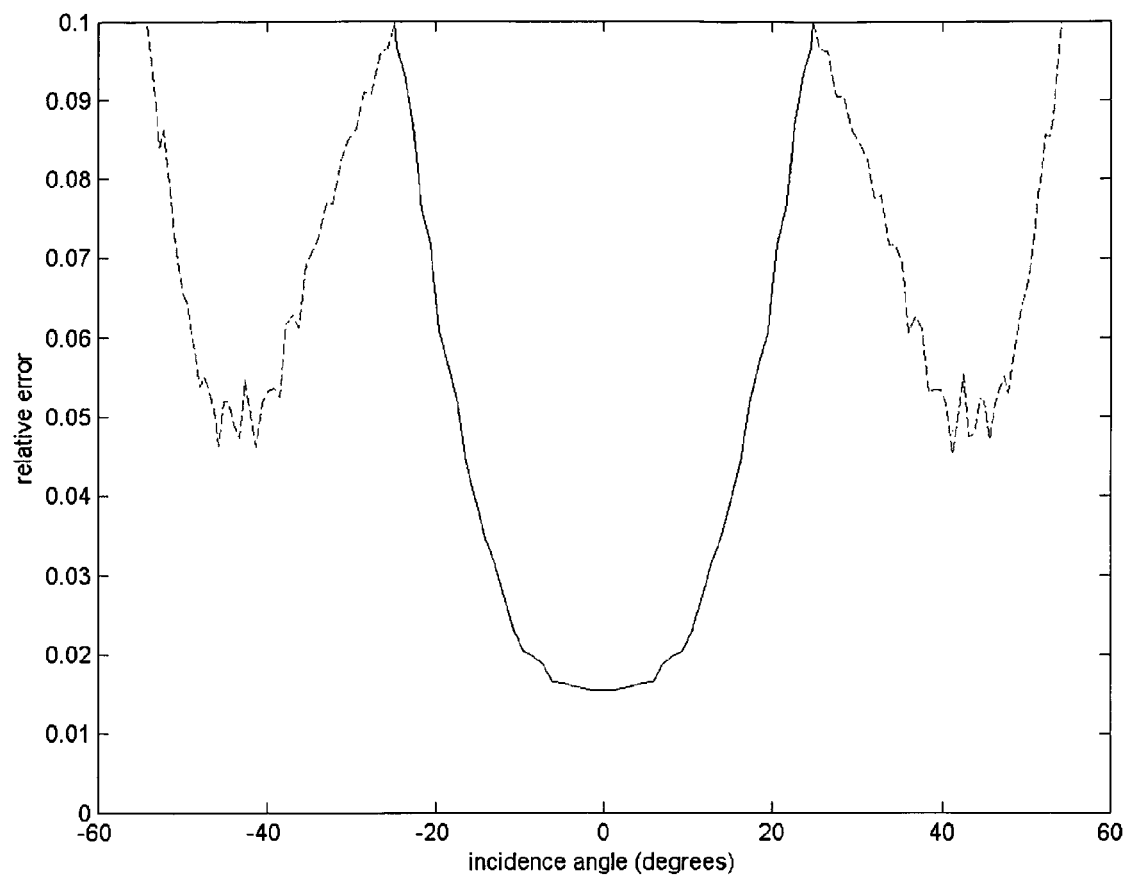
Figure 13:
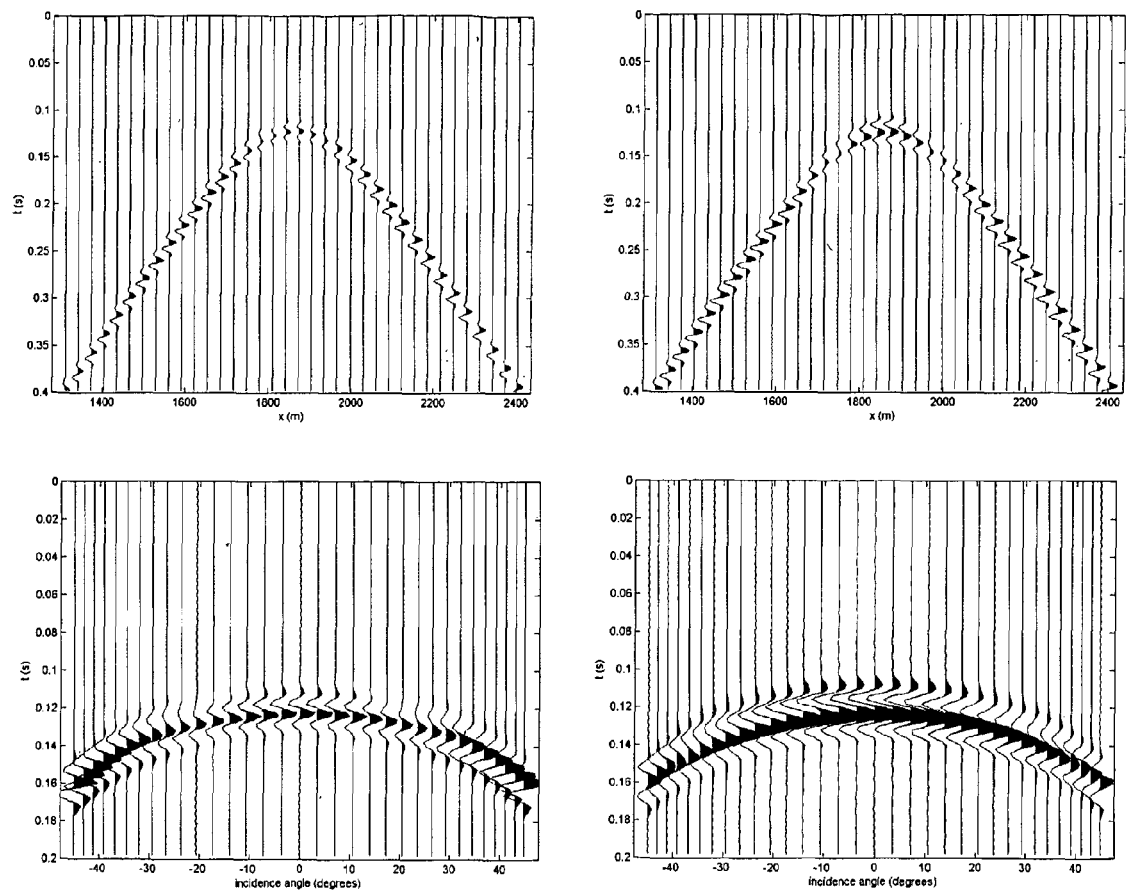
FIG. 13 shows the 3D deghosting results for twin streamer configurations 1 and 2 in similar fashion to those shown in FIGS. 9 and 11, but using a vertical incidence approximation when filtering the lower streamer to compute the vertical component of particle velocity in order to avoid a one-sided difference approximation.
Figure 14:
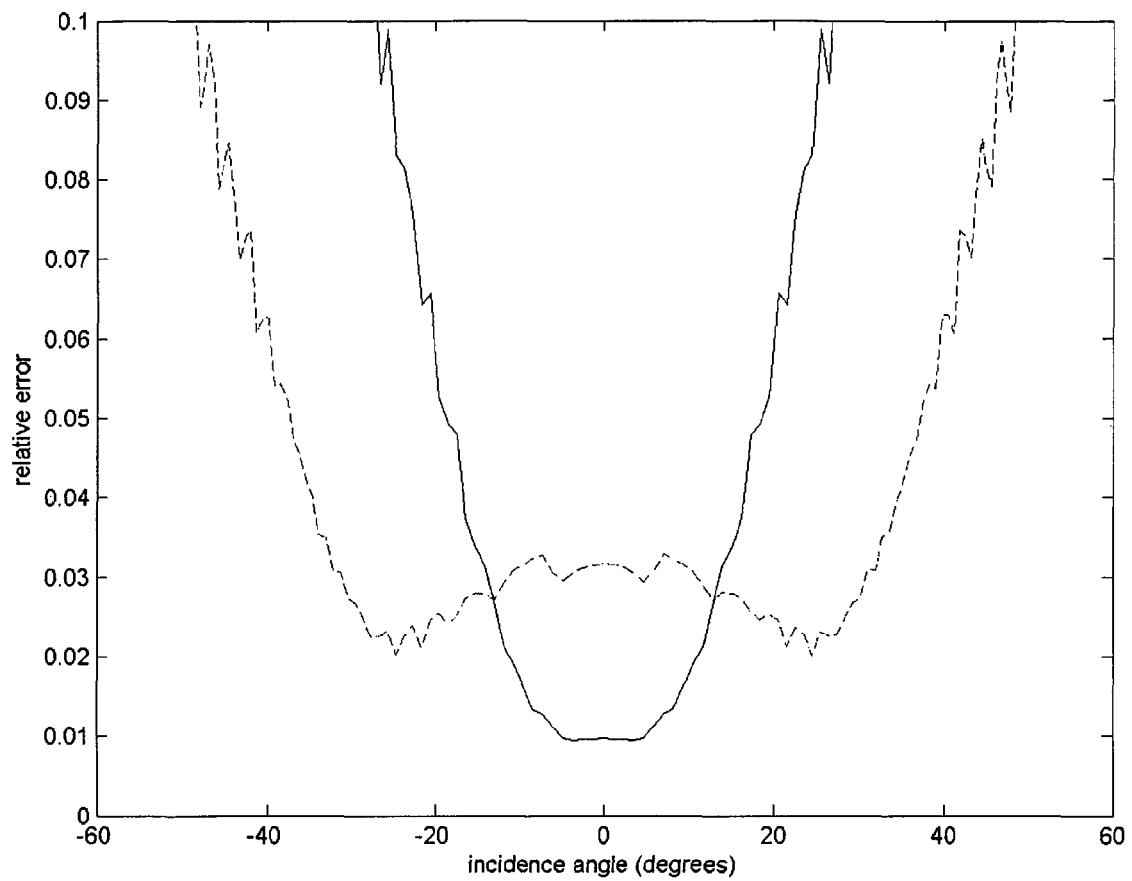
FIGS. 14 and 15 show 3D (normalized) maximums of the differences between deghosted data and the true up-going vertical particle velocity for each trace using the twin streamer solution (configurations 1 and 2, respectively).
Figure 15:
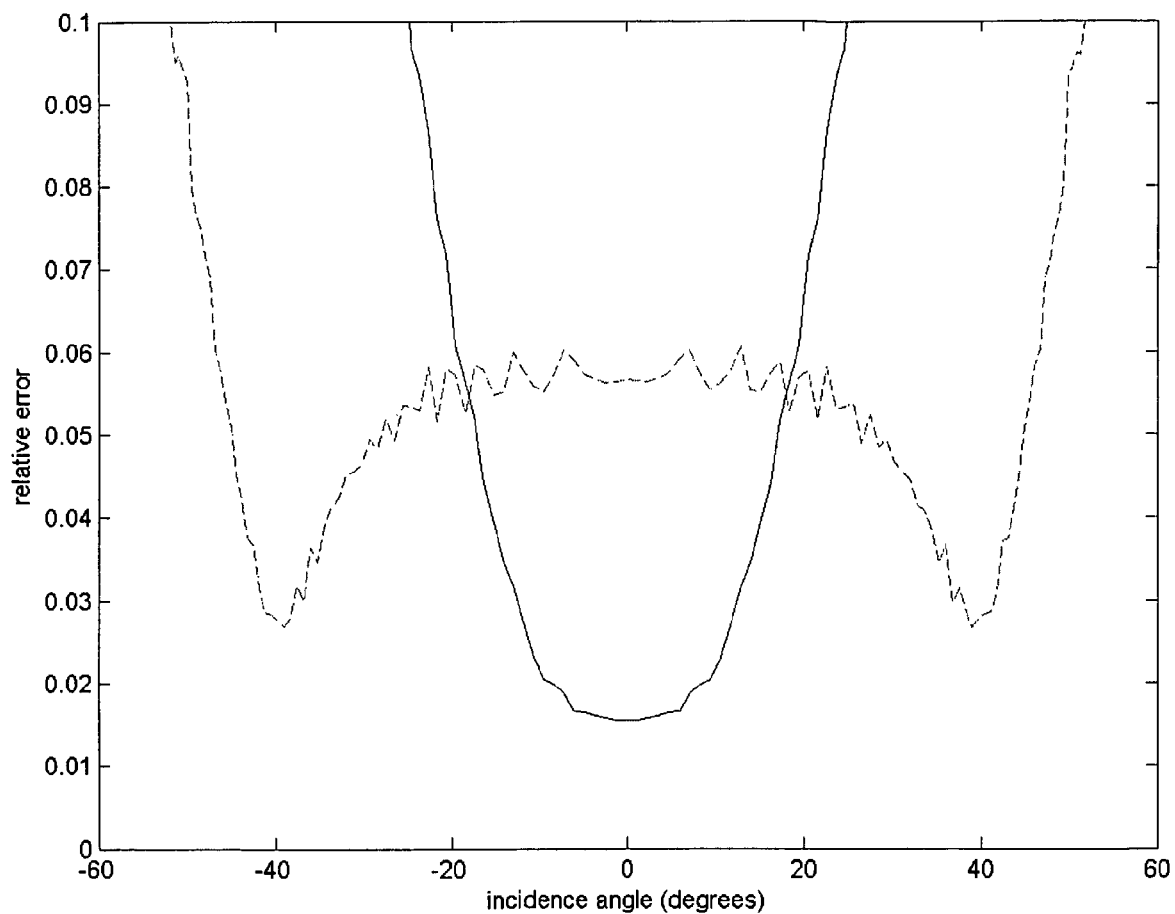

In FIG. 13 we show the 3D deghosting results for twin streamer configurations 1 and 2 exactly as those shown in FIGS. 9 and 11 (i.e., we have used equation (13) to estimate the second-order horizontal derivative), but this time we have used a vertical incidence approximation when filtering the lower streamer to compute the vertical component of particle velocity in order to avoid a one-sided difference approximation. The full expression was used in all other places. Although this is a compromise away from the most accurate deghosting solution we can see that the result now has substantially improved. FIGS. 14 and 15 show the error curve as a function of incidence angle. We now obtain a solution that is an improvement over the standard 2D deghosting solution—at least away from vertical incidence where the 2D solution seems to be somewhat better. The sub-optimal behavior at normal incidence is somewhat puzzling but could be caused by a numerical artifact in the synthetics or filtering. The second-order horizontal derivative of pressure is calculated using equation (13), but with a vertical incidence approximation when filtering the lower streamer to compute the vertical component of particle velocity. Both curves above show the (normalized) maximum of the differences between deghosted data and the true up-going vertical particle velocity for each trace. The solid curve depicts deghosting using the "vertical incidence approximation" in equation (2). The dashed curve depicts deghosting using equations (1) and (3). In FIG. 15, both curves above show the (normalized) maximum of the differences between deghosted data and the true up-going vertical particle velocity for each trace.

Figure 16:
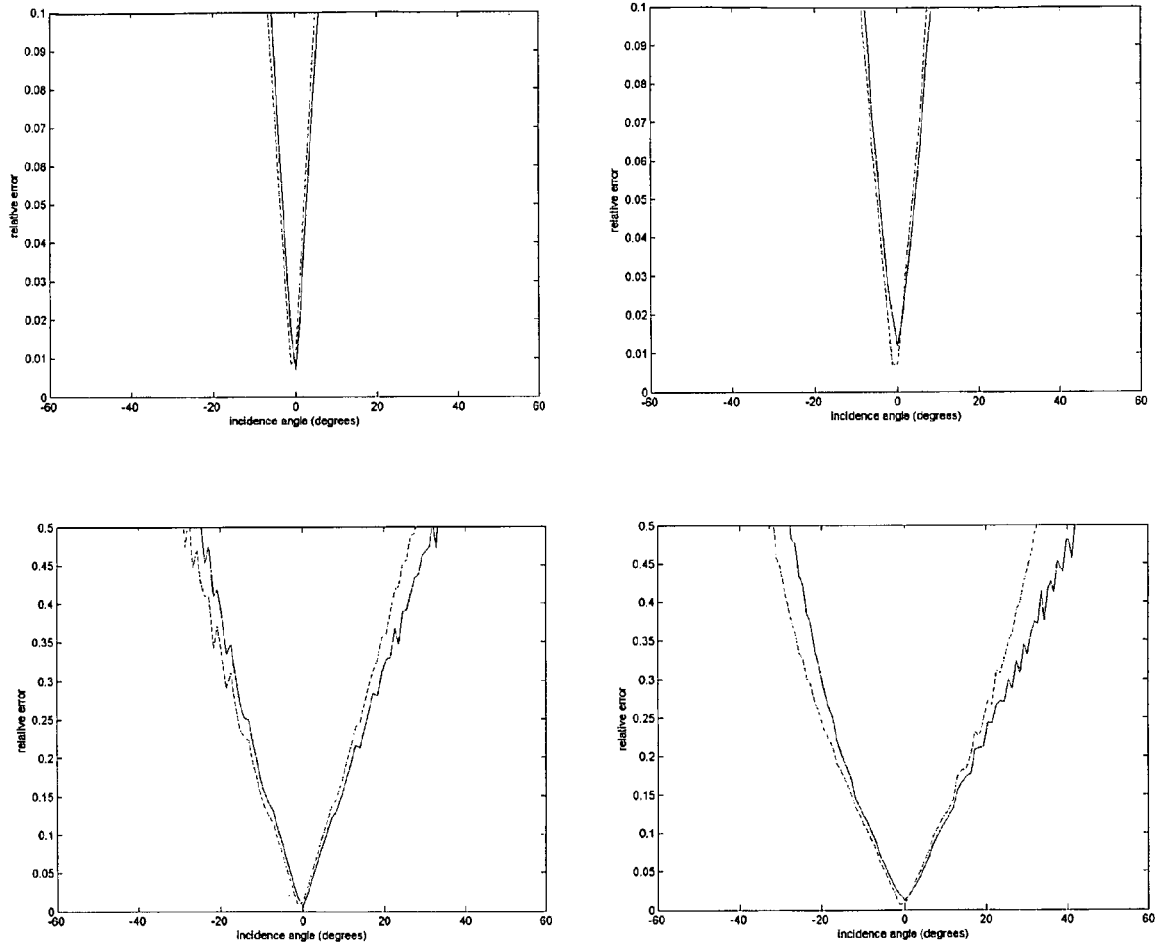
FIG. 16 is a plot representing the sensitivity of 3D deghosting using the twin streamer solution (configurations 1 and 2), showing the effect of a lateral offset misplacement of 3.125 m in the cross-line direction of the lower streamer with respect to the upper streamer.

Next we investigate how sensitive the method based on a twin streamer configuration is with respect to perturbations. First we investigate the effect of a lateral offset of the two streamers in the cross-line direction. FIG. 16 shows the results for configurations 1 and 2 for an unaccounted lateral offset of 3.125 m in the cross-line direction of the lower streamer with respect to the upper streamer. Note that this is a fairly substantial perturbation as the two streamers are only spaced 3 m apart. The left column depicts configuration 1, while the right column depicts configuration 2. The top row is a zoom in on the two plots in the bottom row. Dashed and solid curves show the maximum of the differences between deghosted data and the true up-going vertical particle velocity for each trace. As with other plots herein, the solid curve depicts deghosting using the "vertical incidence approximation" in equation (2). The dashed curve depicts deghosting using equations (1) and (3).

The solution rapidly breaks down away from vertical incidence. However, it is worthwhile to note that the 3D deghosting solution never is worse than the 2D deghosting solution in the cross-line direction. Nevertheless, we conclude that in order to deghost data in 3D using a twin streamer configuration we must pay careful attention to the location of the two streamers with respect to each other in the cross-line direction. Although the two streamers may possibly not be required to right on top of each other at all times, it will be desirable to know the relative location of the two streamers accurately relative to each other so that this can be accounted for.

Figure 17:
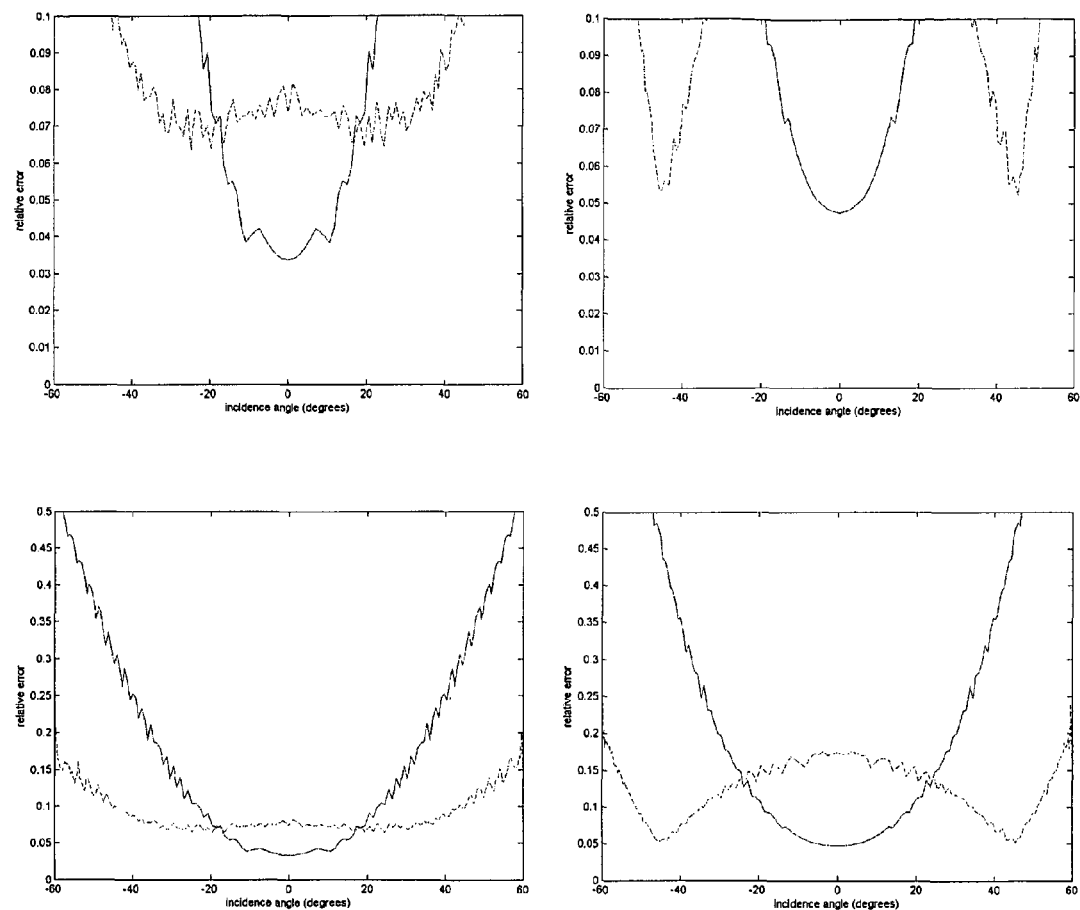
FIG. 17 is a similar plot to FIG. 16, but showing show the effect of a vertical offset misplacement of 0.3 m (deeper) by the lower streamer.

Finally, FIG. 17 shows the results for configurations 1 and 2 for an unaccounted vertical offset such that the lower streamer is 0.3 m deeper than anticipated (10% perturbation with respect to the streamer separation). Although the perturbation clearly has a negative impact on the result we note that the effect is less dramatic than that of the cross-line perturbation. This could possibly also be related to the magnitude of the introduced perturbation being smaller.

Results: Multicomponent Streamer Solution

The multicomponent streamer solution for 3D deghosting only relies on estimating the second-order spatial cross-line derivative of pressure for use in equation (3). Again, we begin by verifying what is the very best we can do for the deghosting solution by calculating the second-order horizontal derivative directly from the synthetics instead of estimating it. This will serve as our benchmark solution of how well we can do when assessing the deghosting results.

Figure 18:
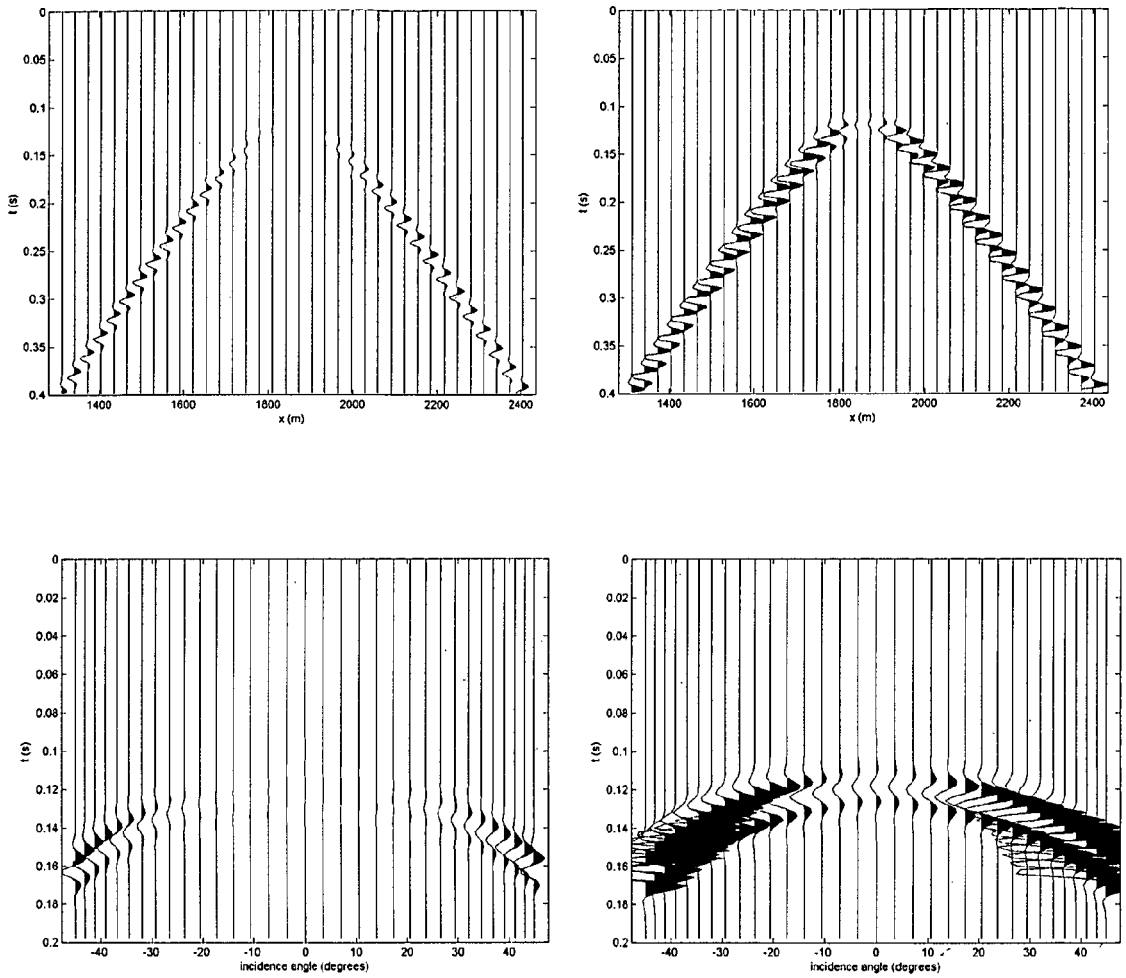
FIG. 18 shows plotted differences between benchmark solutions for 3D deghosting using the multicomponent streamer solution according to the present invention and a true up-going vertical particle velocity.

FIG. 18 shows the deghosting results in terms of differences between benchmarked deghosted data and the true up-going vertical component of particle velocity, using the multicomponent streamer solution. As mentioned previously, in the benchmark solution we make use of the second-order horizontal derivative of pressure computed directly in the FD simulation (the best that we could possibly do). The left-hand column in FIG. 18 shows the results using the 3D deghosting solution presented in this application. The bottom left panel is a zoom in on the top left panel. The right-hand column in FIG. 18 shows the results using the "vertical incidence approximation" or what we implicitly achieve in the cross-line direction when applying 2D deghosting in-line. The bottom right panel is a zoom in on the top right panel.

Figure 19:
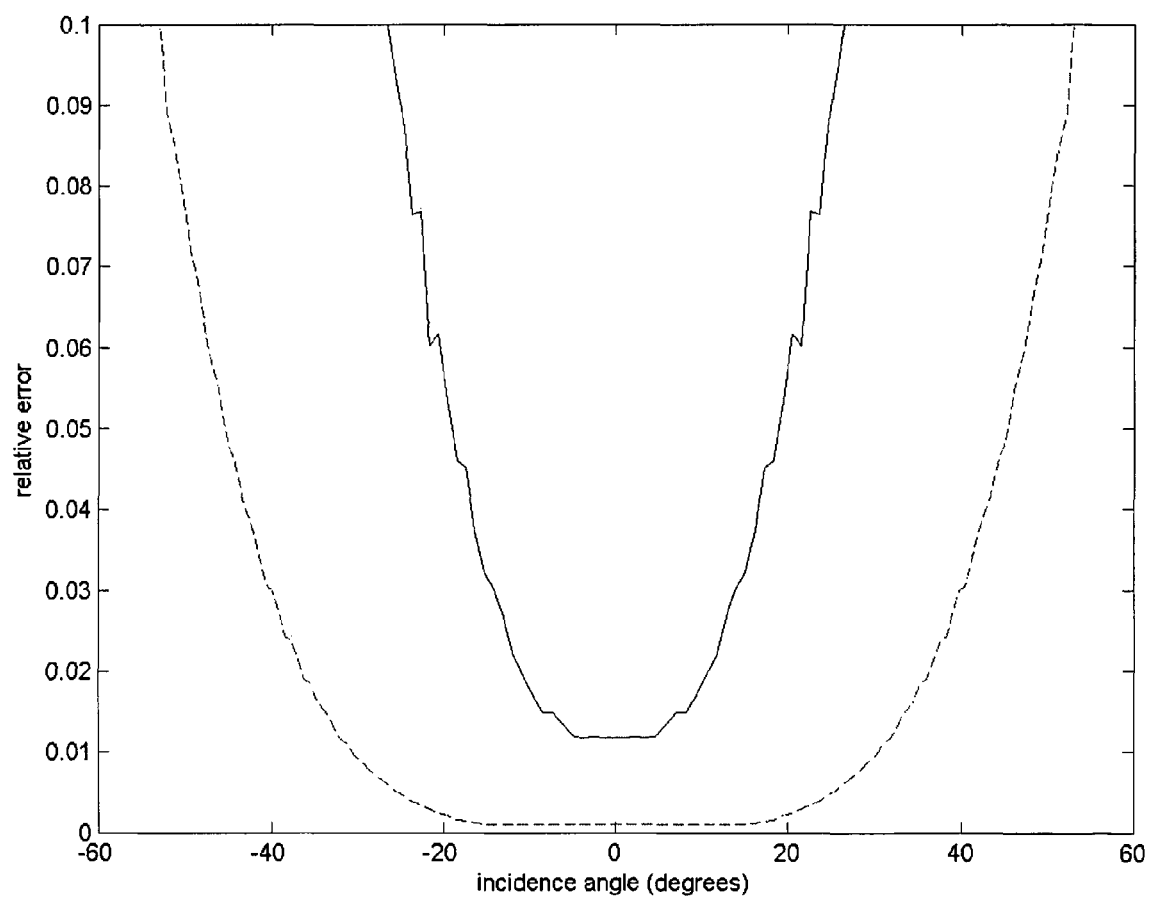
FIG. 19 shows the plotted maximums of each trace in the two bottom panels of FIG. 18 normalized by the maximum of the true up-going vertical component of particle velocity.

In FIG. 19 we have plotted the maximum of each trace in the two bottom panels of FIG. 18 normalized by the maximum of the true up-going vertical component of particle velocity. This plot therefore represents the error of the deghosting as a function of incidence angle. The solid curve represents the 2D deghosting results whereas the dashed curve represents the 3D deghosting results. We note that we have increased the region of successful deghosting significantly by introducing the 3D solution. A 1.5% relative error is reached already at 10 degrees incidence angle for 2D deghosting whereas it is reached at 40 degrees incidence angle for the 3D deghosting solution.

Figure 20:
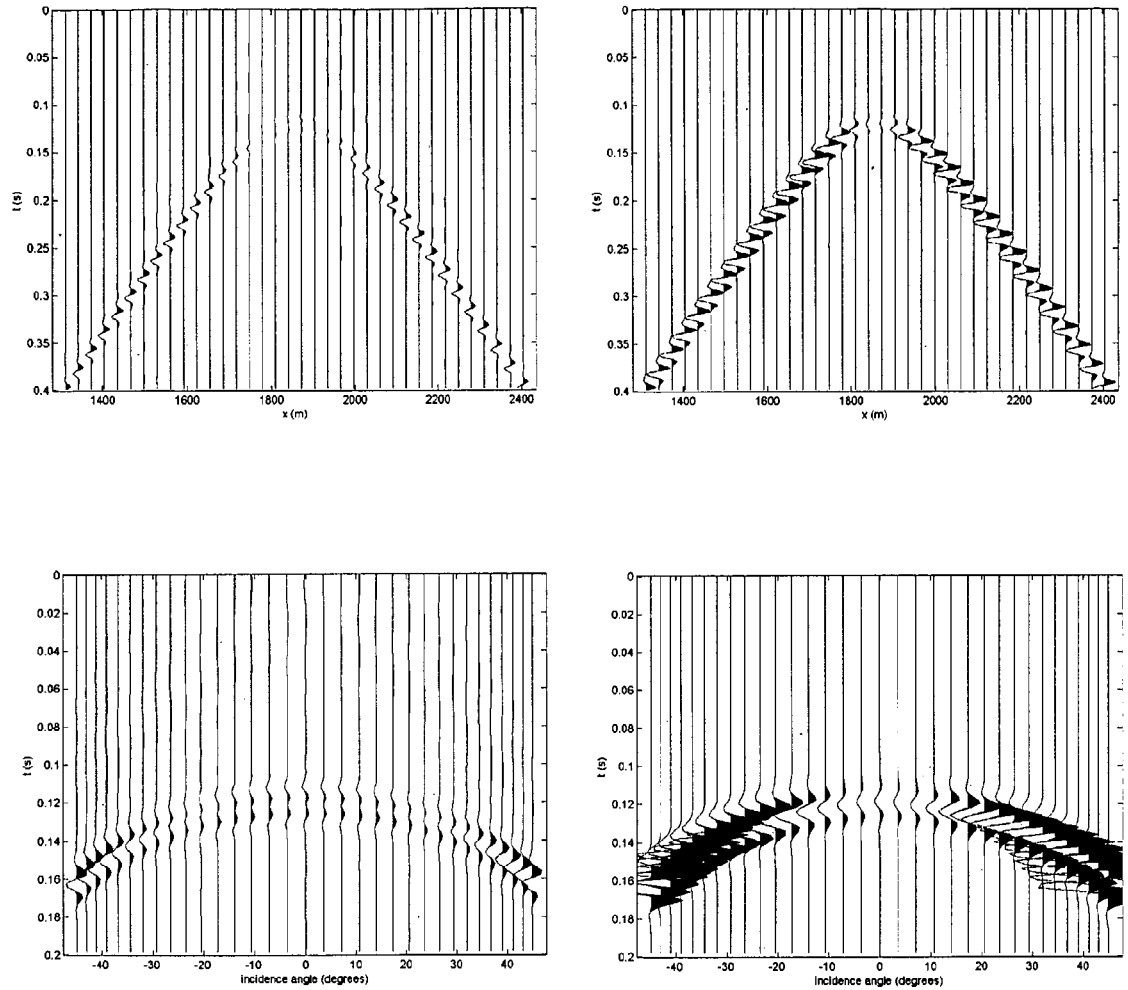
FIGS. 20, 21, 22 and 23 show analogous results to those shown in FIGS. 18 and 19, but using an equation to estimate the second-order horizontal derivative, with FIGS. 20 and 21 showing the results for a streamer depth of 4 m and FIGS. 22 and 23 showing the results for a streamer depth of 6 m.
Figure 21:
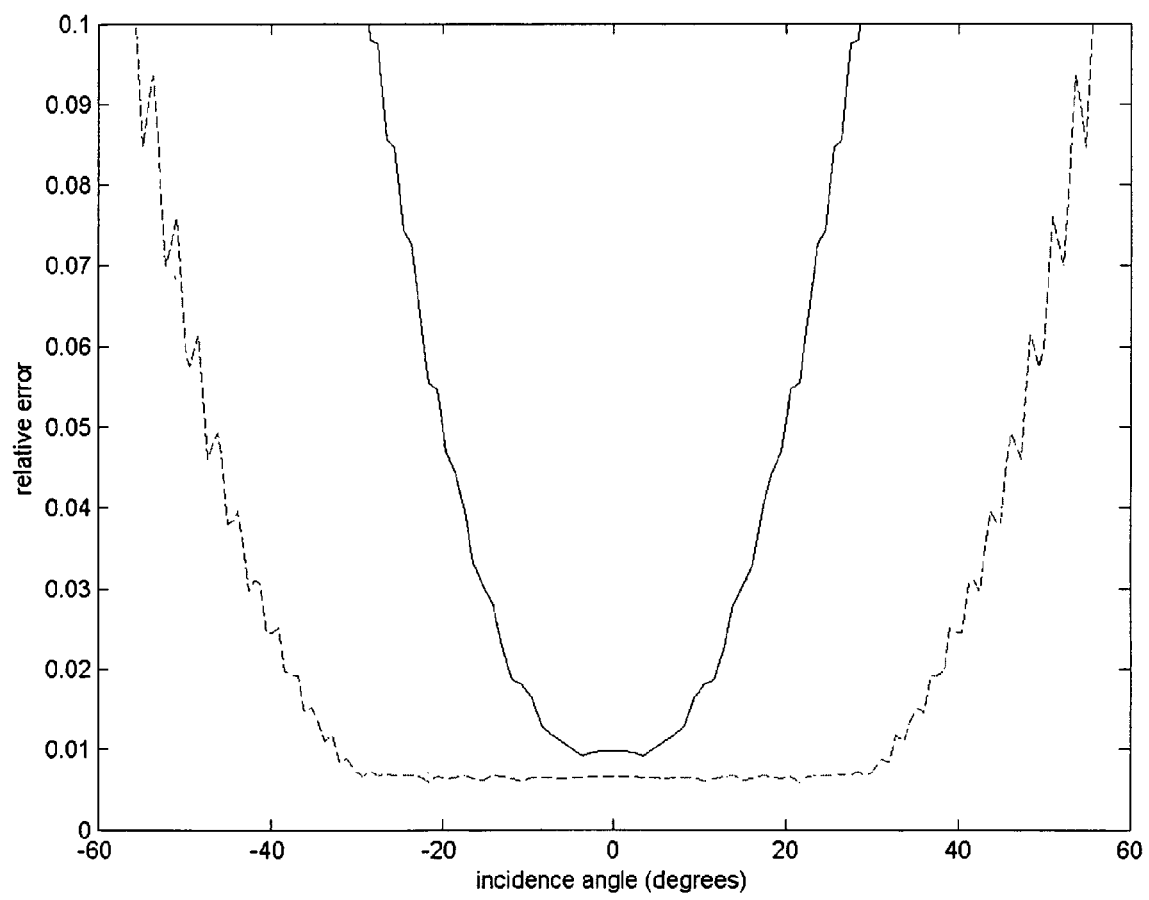
Figure 22:
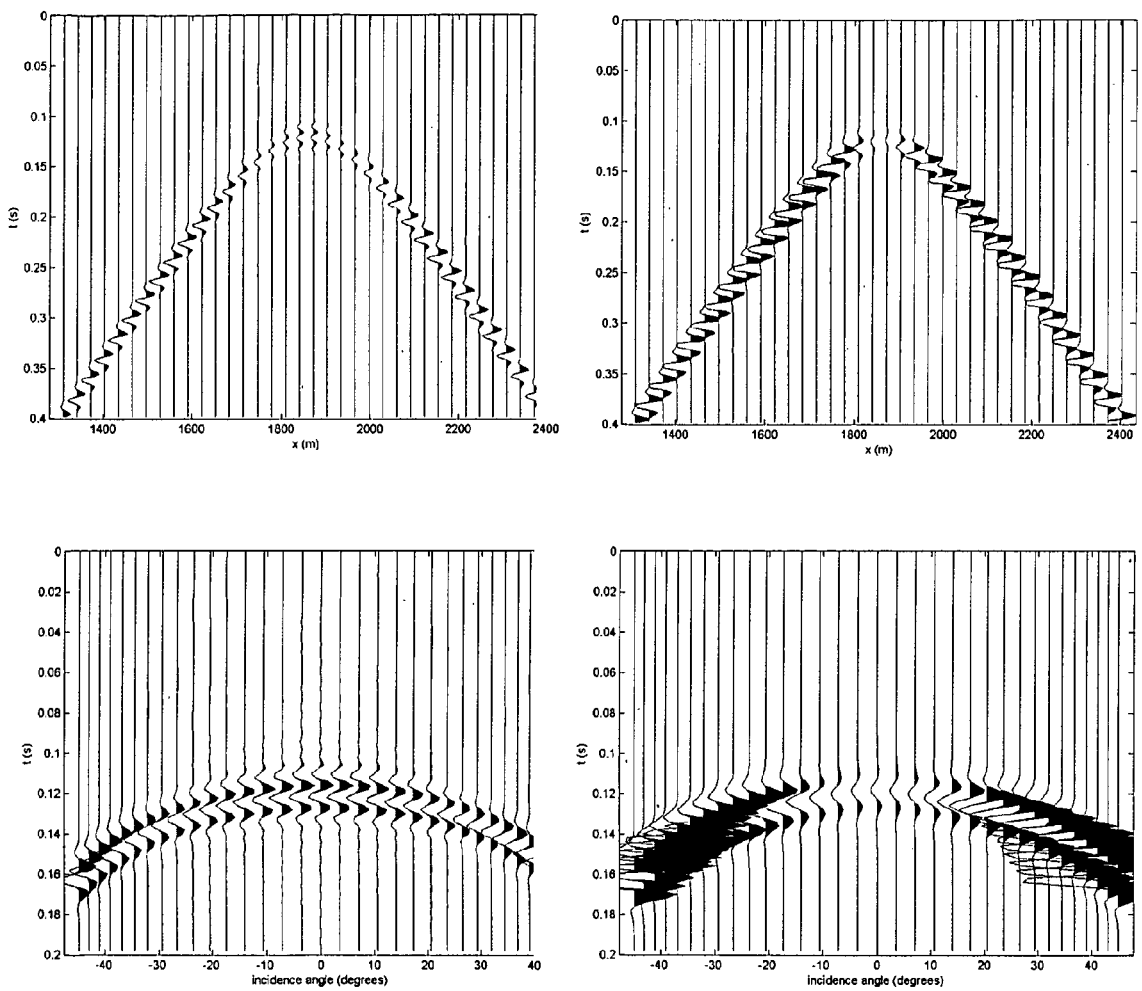
Figure 23:
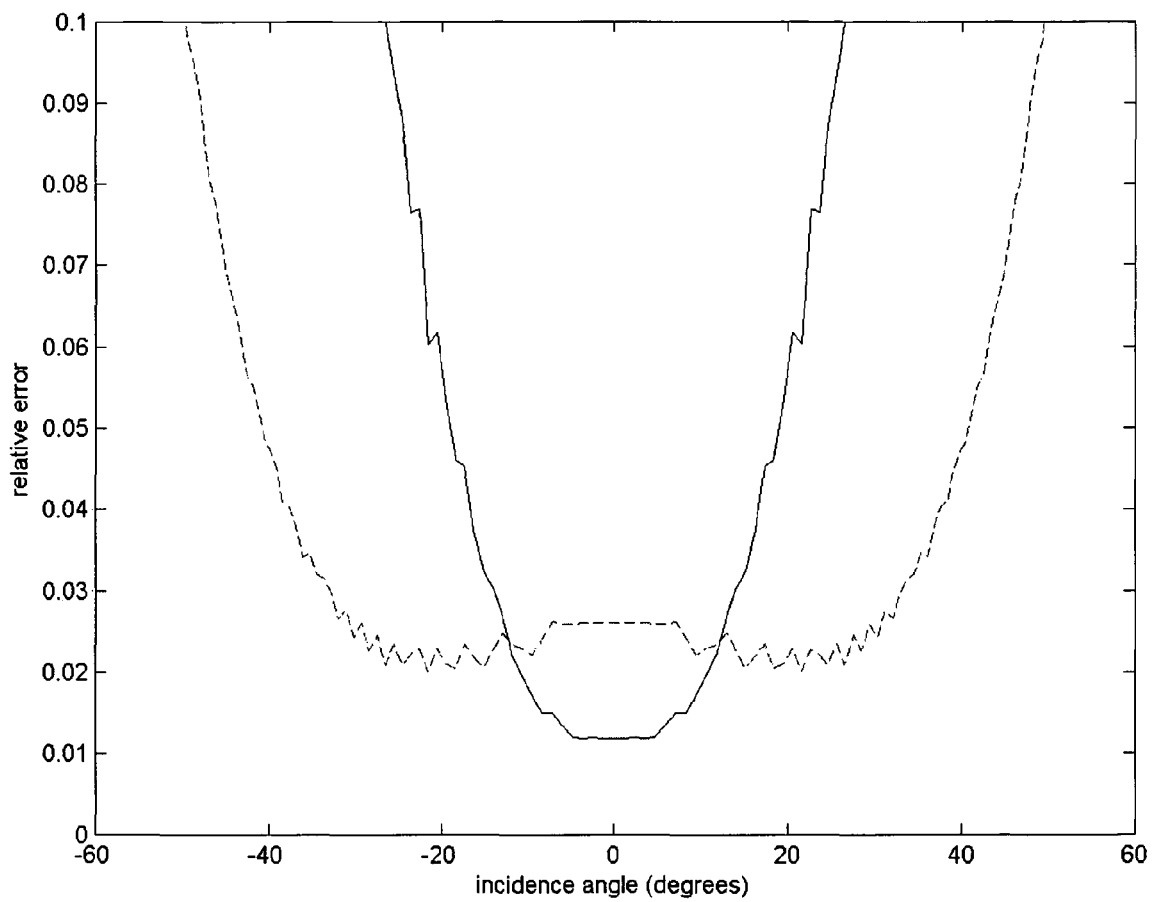

FIGS. 20, 21, 22 and 23 show analogous results to those shown in FIGS. 18 and 19 but this time around we have used equation (7) to estimate the second-order horizontal derivative of pressure. In FIGS. 20 and 21 we show the results for a streamer depth of 4 m. The results are excellent and almost as good as the benchmark solution in FIGS. 18 and 19. FIGS. 22 and 23 show the results for a streamer depth of 6 m. Also these results show a significant improvement over the standard 2D deghosting although the results are somewhat degraded compared to the 4 m streamer depth results. In the tests, a 50 Hz Ricker wavelet was used with significant energy up to 110 Hz. If a wavelet with slightly lower frequency content had been used we would of course expect the results for the streamer at 6 m depth to be improved somewhat.

The multicomponent streamer has no problems with ghosts at DC or higher notches since the pressure and particle velocity components have complementary notches in their spectra. Therefore it does not matter at what depth the streamer is towed. In order to reduce noise it is however desired to tow the streamer at as great depths as possible. In calm weather it could be possible to tow the streamer at say 4 m, particularly if this enables a 3D deghosting solution at high frequencies as shown in this application.

Figure 24:
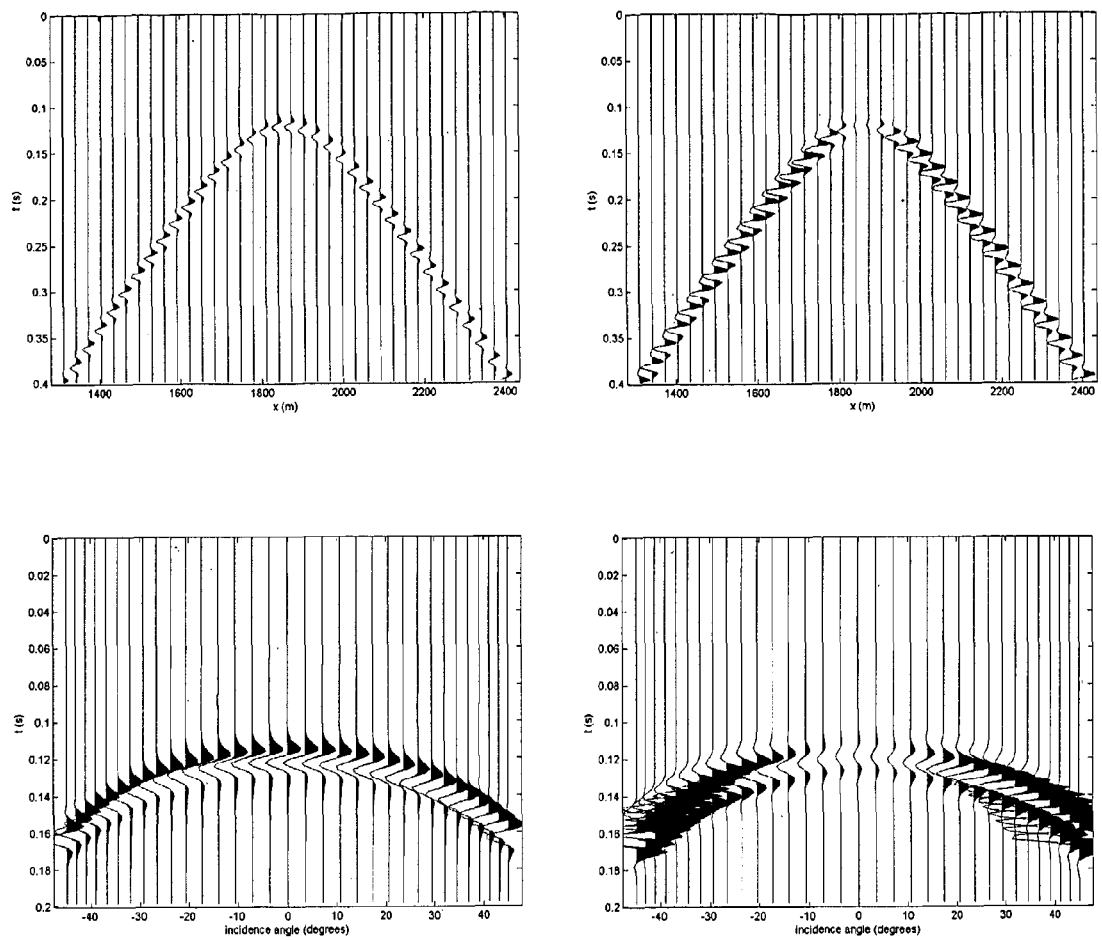
FIGS. 24, 25, 26 and 27 show analogous results to those shown in FIGS. 20, 21, 22 and 23, but illustrating the sensitivity of the algorithm to perturbations in depth assumptions.
Figure 25:
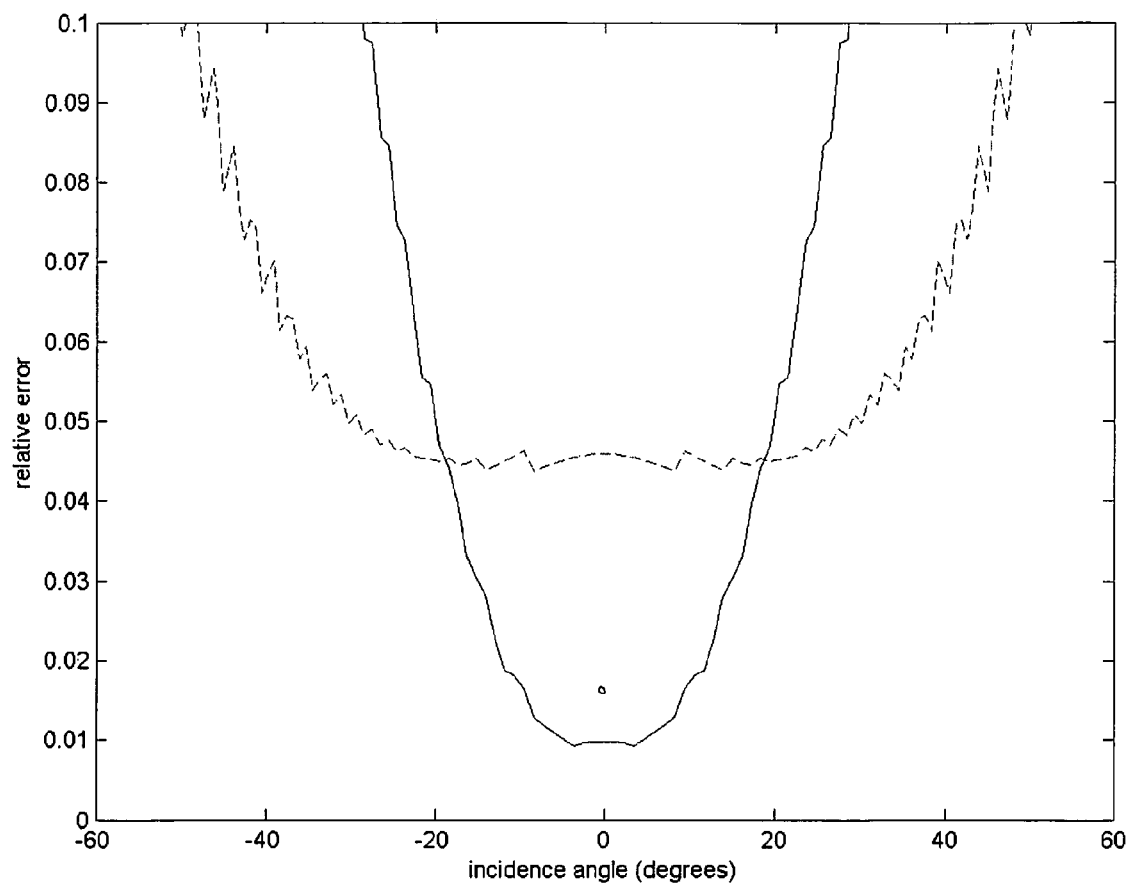
Figure 26:
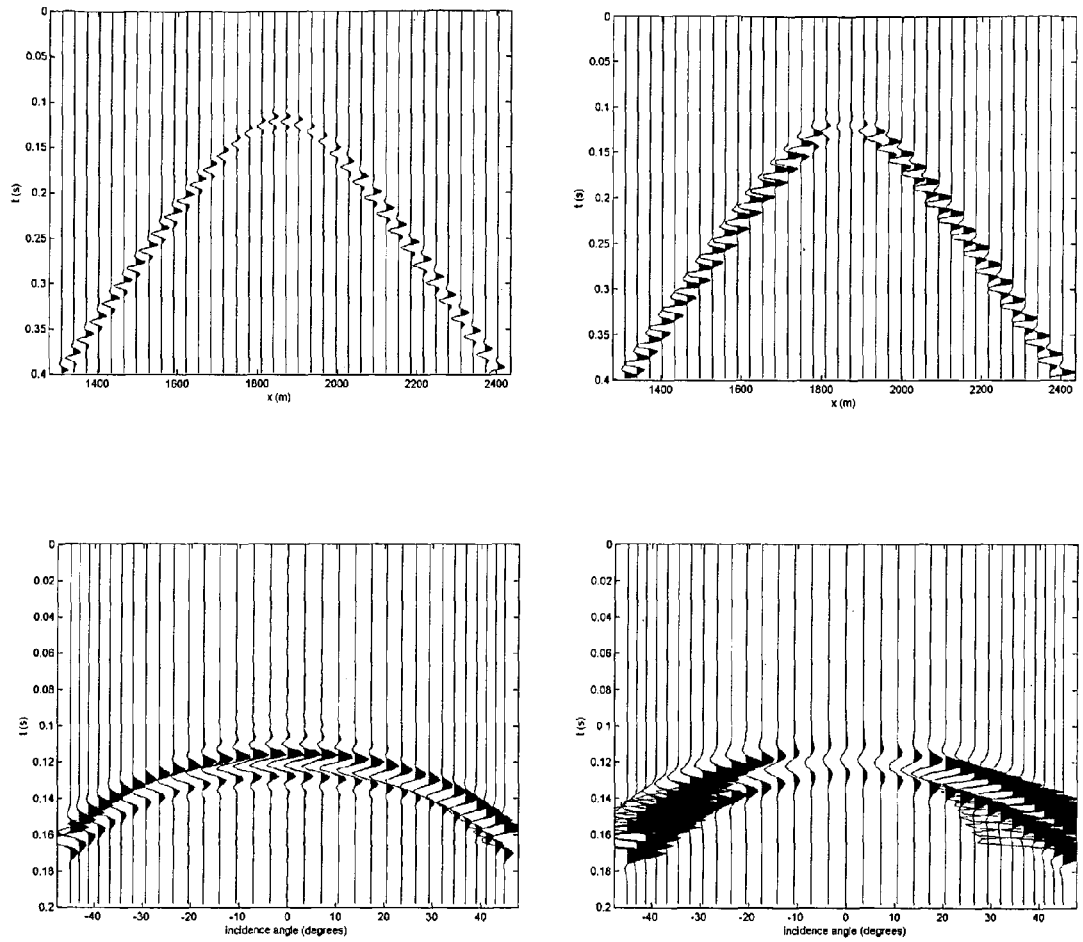
Figure 27:
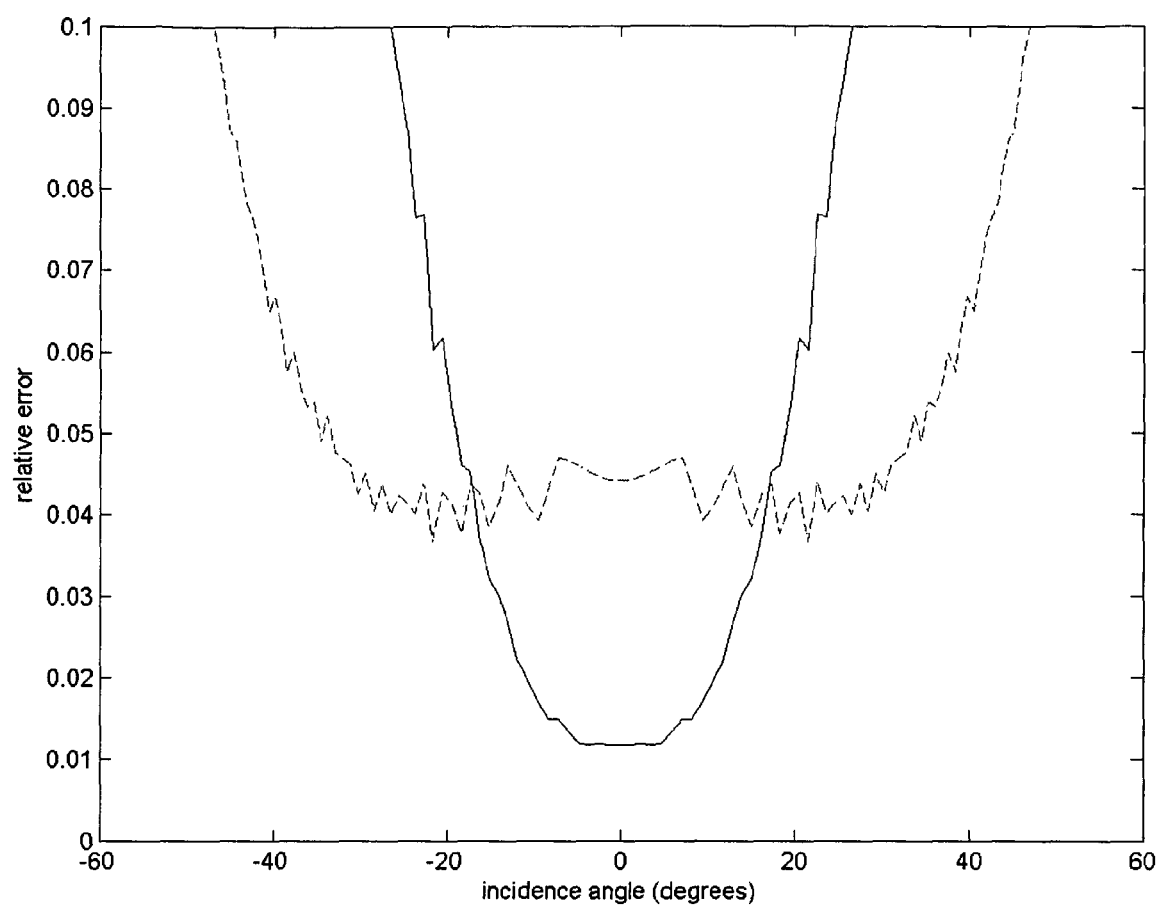

FIGS. 24, 25, 26 and 27 show analogous results to those shown in FIGS. 20, 21, 22 and 23 but this time we have used the wrong depth of the streamer in the 3D deghosting in order to investigate the sensitivity of the algorithm to perturbations. In FIGS. 24 and 25 we show the results for a streamer depth of 4 m where we instead assumed that the depth was 3.9 m. In FIGS. 26 and 27 we show the results for a streamer depth of 6 m where we instead assumed that the depth was 5.9 m. The result degrades quickly also for a small perturbation of 0.1 m in this parameter and we conclude that the depth of the streamer below the sea surface must be known within this distance to provide an accurate 3D deghosted result. Again, the second-order horizontal derivative of pressure is calculated using equation (7). In FIGS. 25 and 27, the curves show the (normalized) maximum of the differences between deghosted data and the true up-going vertical particle velocity for each trace. The solid curve depicts deghosting using the "vertical incidence approximation" in equation (2), while the dashed curve depicts deghosting using equations (1) and (3).

Figure 28:
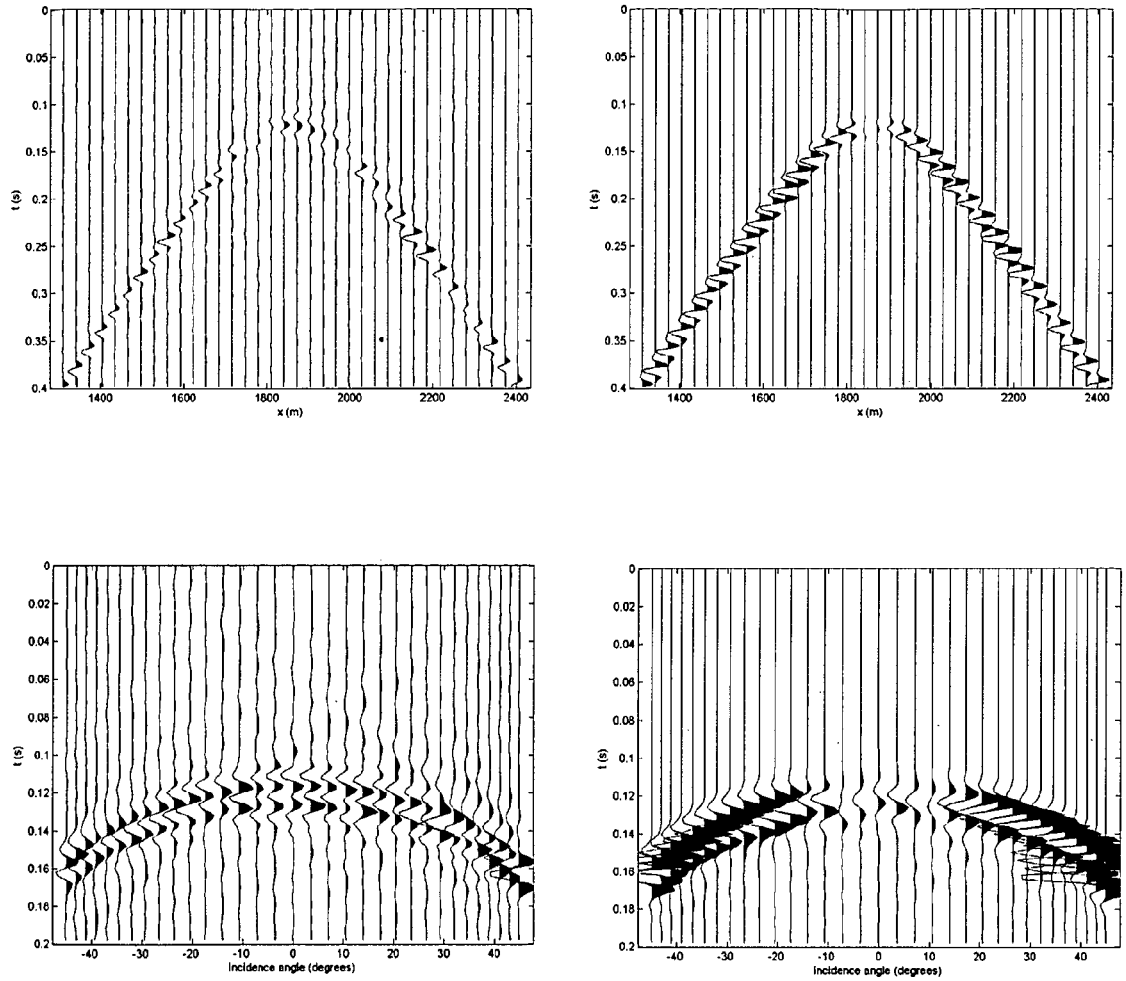
FIGS. 28, 29, 30 and 31 show analogous results to those shown in FIGS. 20, 21, 22 and 23, but using a rough sea approximation with a significant wave-height (SWH) of 4 m in order to verify that we are indeed capable of dealing with a rough sea.
Figure 29:
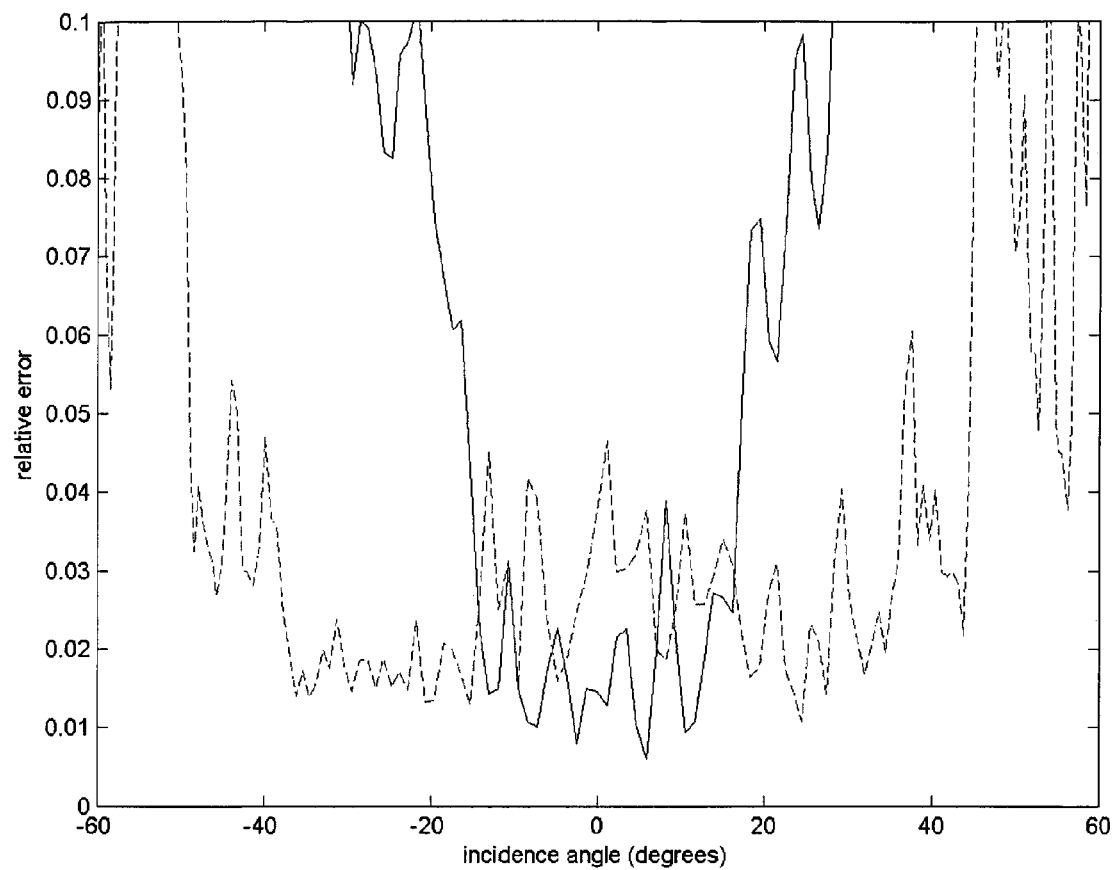
Figure 30:
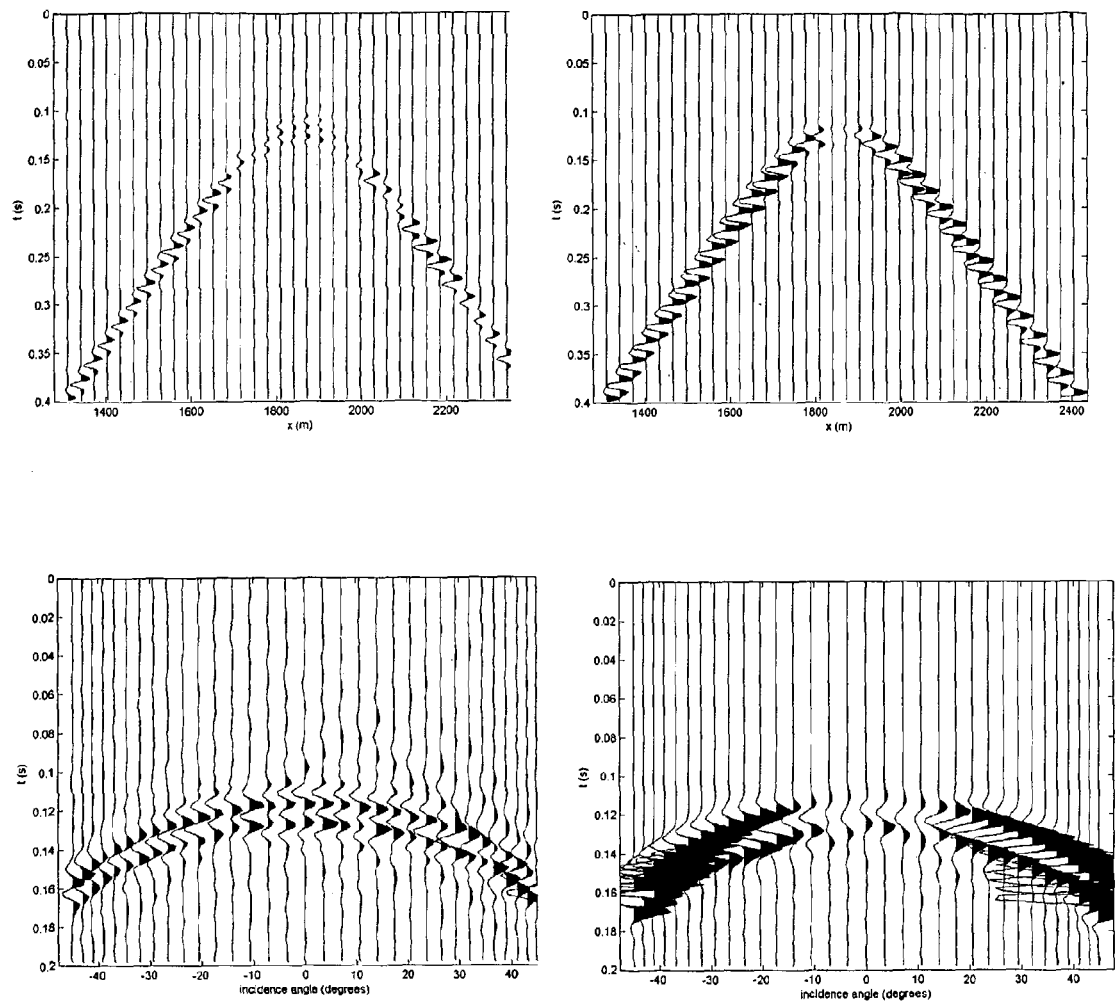
Figure 31:
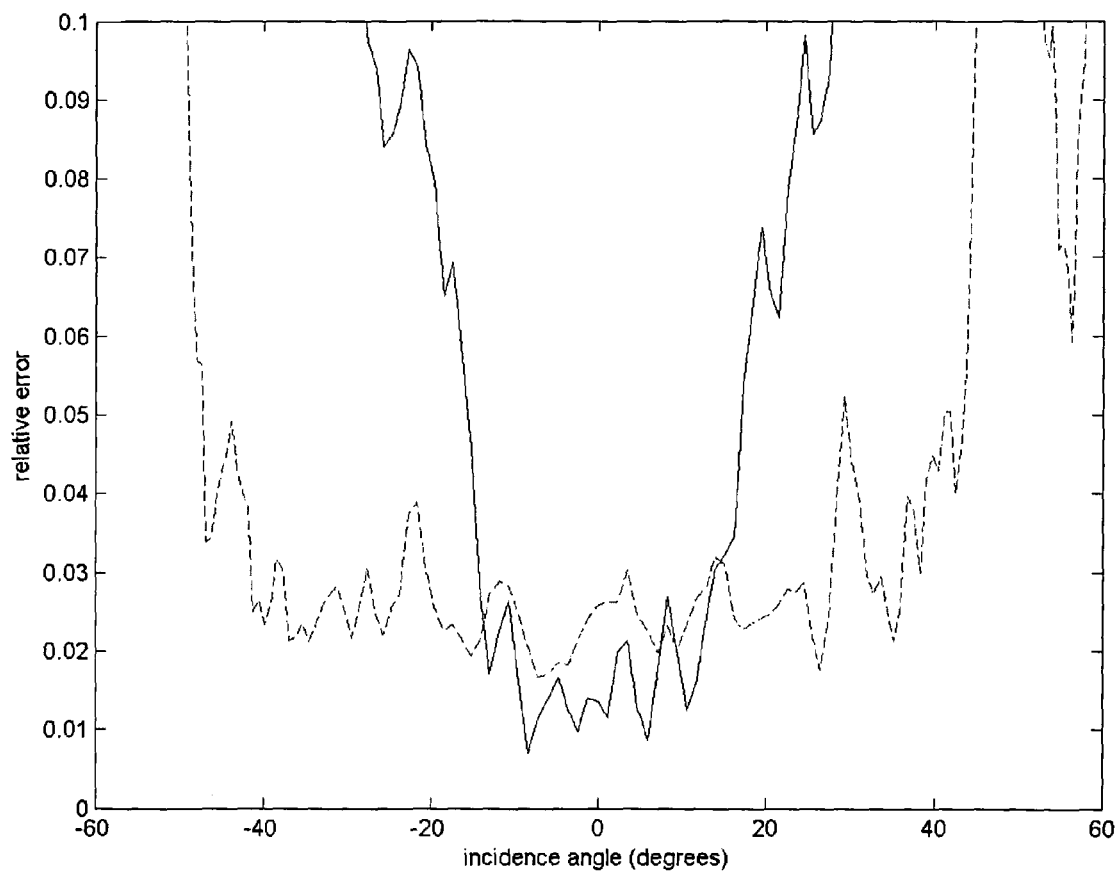

The 3D deghosting algorithm has been designed to be implemented with compact deghosting filters to remove the rough sea effects. FIGS. 28, 29, 30 and 31 show analogous results to those shown in FIGS. 20, 21, 22 and 23, but this time we have used a rough sea with a significant wave-height (SWH) of 4 m in order to verify that we are indeed capable of dealing with a rough sea. We conclude that also in the presence of a rough sea the algorithm works very well. FIGS. 28 and 29 depict a rough sea test (4 m SWH) of 3D deghosting using the multicomponent streamer solution towed 4 m below the average sea surface. FIGS. 30 and 31 depict a rough sea test (4 m SWH) of 3D deghosting using the multicomponent streamer solution towed 6 m below the average sea surface.

CONCLUSIONS

In this application we have discussed the 3D aspect of deghosting and proposed two solutions. What is commonly referred to as "3D effects" can be subdivided into four groups:

A 3D acquisition geometry with significant cross-line offsets between some of the streamers and the source(s).

A 2D approach assumes cylindrical spreading of a wavefront in space whereas in 3D it is spherical.

The sea surface has a 3D structure causing scattering out-of-plane.

There may be significant cross-line variation in the subsurface causing out-of-plane reflections and scattering.

In a "2D" approach such as the ones proposed in the past (Robertsson and Kragh, 2002; Robertsson et al., 2003; Amundsen et al., 2003) the first two groups can be successfully dealt with. The two last groups on the list cannot be addressed using the "2D" approaches. Of these the third group on the list, the 3D structure of the rough sea surface, is likely less important than the fourth group.

Being able to properly account for wave propagation out-of plane is critical in areas with complex imaging tasks (salt, fault blocks, etc.) or multiple problems (e.g., diffracted multiples). The methods proposed in this application may provide a solution also to these areas.

We have presented three solutions for 3D deghosting:

The first technique requires data to be recorded in a twin streamer (over/under) configuration towed in the vicinity of the sea surface (say at depths of 6 m and 9 m).

The second technique requires pressure and vertical component of particle velocity data recorded using a multicomponent streamer also that towed in the vicinity of the sea surface (say at 6 m depth).

The third technique requires three streamers to be towed either horizontally or vertically separated at any depth below the sea surface to either explicitly or implicitly (using the wave equation) estimate the second-order cross-line derivative of pressure.

These techniques include full rough-sea deghosting.

The methods rely on having second-order derivatives in the cross-line direction available. Although in principle these can be measured explicitly (e.g., by having three streamers very close parallel to each other in the horizontal plane), such an approach may be operationally, logistically or economically unattractive. Instead we propose to estimate the second-order cross-line derivative through in-direct measurements of other wavefield quantities and by using wave-equation techniques to compute the desired term.

The twin streamer technique gave reasonable results but was found to be somewhat sensitive to perturbations. However, although introducing perturbations quickly degraded the 3D solution, it was found to always be as good as (or better than) the 2D solution under similar circumstances. The multicomponent streamer technique on the other hand gave excellent results for streamer depths of 4 m as well as 6 m below the sea surface, also in the presence of a rough sea. Roughly, we obtain a similar relative error in the 3D algorithm for incidence angles of 40 degrees away from vertical as we do for the 2D algorithm at 10 degrees away from the vertical. This is a very significant improvement. We also found that in order to obtain high quality results the depth of each hydrophone below the sea surface must be known to within 10 cm.

A 3D deghosting solution can be particularly interesting to efficiently attenuate diffracted multiples. Robertsson and Kostov (2003) outline a technique for 3D multiple suppression that does not require a 3D acquisition geometry but rather acts on a trace-to-trace basis. However, the method assumes that the data has been properly deghosted first (in 3D).

Alternatively, 3D deghosting may be an important step for Amundsen demultiple (Amundsen, 2001) to be effective for towed streamer configurations and to deal with diffracted multiples. We also anticipate that the difference between the 2D deghosted and 3D deghosted data could be used to mark arrivals that have a cross-line component such that they could be suppressed during the imaging process.

It will be understood from the foregoing description that various modifications and changes may be made in the preferred and alternative embodiments of the present invention without departing from its true spirit.

This description is intended for purposes of illustration only and should not be construed in a limiting sense. The scope of this invention should be determined only by the language of the claims that follow. The term "comprising" within the claims is intended to mean "including at least" such that the recited listing of elements in a claim are an open group. "A," "an" and other singular terms are intended to include the plural forms thereof unless specifically excluded.

The invention claimed is:

1. A method of de-ghosting seismic data, comprising the steps of:

using a multicomponent streamer to measure a vertical particle velocity and a pressure in a fluid medium;

converting the acquired vertical component of particle velocity to a vertical pressure gradient using the equation of motion:

$$\frac{\partial p}{\partial z} = i\omega\rho v_z,$$

where:
ω is the angular frequency,
ρ is the density of water, and
$v_z$ is the vertical component of particle velocity;

determining a second-order cross-line derivative of pressure for marine seismic wavefield data that takes into account three dimensional effects on the marine seismic wavefield data from the measured vertical particle velocity, the vertical pressure gradient and the pressure, wherein the second-order cross-line derivative of pressure is determined according to the equation:

$$\frac{\partial^2 p}{\partial y^2} = \frac{3}{1+\frac{2}{15}k^2 h^2}\left[\frac{k\cot(kh)}{h}p - \frac{i\omega\rho}{h}v_z\right] - \frac{\partial^2 p}{\partial x^2} + O(h),$$

where:
p is the pressure,
k=ω/c,
ω is the angular frequency,
c is the velocity in water,
ρ is the density of water,
h is the instantaneous wave-height at each hydrophone location as a function of time (needs to be implemented in the time domain), and
$O(h^2)$ denotes the greatest error term in the expansion;

using the determined second-order cross-line derivative of pressure in a process to decompose the seismic wavefield data; and using the decomposed seismic wavefield to generate an image of a section of an interior of the Earth.

2. The method of claim 1, wherein the marine seismic wavefield data is acquired using at least one seismic source.

3. The method of claim 1, wherein wave equation techniques are used with the determined second-order cross-line derivative of pressure to decompose the acquired seismic wavefield data.

4. The method of 1, wherein the multicomponent streamer is towed in the vicinity of the surface of the fluid medium.

5. The method of claim 4, wherein the multicomponent streamer is towed beneath the surface of the fluid medium at a depth of at least 2 meters.

6. The method of claim 5, wherein the multicomponent streamer is towed beneath the surface of the fluid medium at a depth not exceeding 50 meters.

7. The method of claim 1, wherein the multicomponent streamer comprises an ocean-bottom cable coupled to the bed of the fluid medium.

8. The method of claim 1, wherein the equation:

$$\frac{\partial^2 p}{\partial y^2} = \frac{3}{1 + \frac{2}{15}k^2h^2}\left[\frac{k\cot(kh)}{h}p - \frac{i\omega\rho}{h}v_z\right] - \frac{\partial^2 p}{\partial x^2} + O(h),$$

is implemented in a space-time domain with a compact filter both in space and time.

9. The method of claim 8, wherein implementing the equation in the space-time domain comprises expanding terms in the equation that do not contain pure factors of k.

10. The method of claim 4, wherein the determining step comprises making use of the proximity of the multicomponent streamer to the sea surface to determine the desired second-order cross-line spatial derivative of pressure.

11. A method of de-ghosting seismic data, comprising the steps of:
measuring the second-order cross-line derivative of pressure for marine seismic wavefield data using three streamers arranged side-by-side and spaced-apart within a fraction of the Nyquist wavenumber;
using the measured second-order cross-line derivative of pressure and suitable techniques to decompose the seismic wavefield data; and
using the decomposed seismic wavefield to generate an image of a section of an interior of the Earth.

12. The method of claim 1, wherein the multicomponent streamer comprises a plurality of geophones configured to provide for directional sensitivity.

13. The method of claim 12, wherein the plurality of geophones comprise three orthogonally arranged geophones.

14. The method of claim 1, wherein the cotangent term, $$\frac{k}{h}\cot(kh),$$

is replaced by a first three terms in its Taylor expansion, $$\frac{1}{h^2} - \frac{k^2}{3} - \frac{k^4h^2}{45}.$$

15. A method of de-ghosting seismic data, comprising the steps of:
using a first streamer to measure a first vertical particle velocity and a first pressure in a fluid medium;
using a second streamer to measure a second particle velocity and a second pressure in the fluid medium, wherein the second streamer is disposed vertically above or vertically below the first streamer;
determining a second-order cross-line derivative of pressure for marine seismic wavefield data that takes into account three dimensional effects on the marine seismic wavefield data from the measured first and second vertical particle velocities and the first and second pressures, wherein the second-order cross-line derivative of pressure is determined from the wave equation $$\frac{\partial^2 p}{\partial y^2} = \frac{\partial^2 p}{\partial t^2} - \frac{\partial^2 p}{\partial x^2} - \frac{\partial^2 p}{\partial z^2};$$

using the determined second-order cross-line derivative of pressure in a process to decompose the seismic wavefield data; and
using the decomposed seismic wavefield to generate an image of a section of an interior of the Earth.

16. The method of claim 15, wherein depth of the first and the second streamers does not differ by more than 6 meters.

17. The method of claim 15, wherein depth of an uppermost of the first and the second streamers is not greater than 6 meters.

* * * * *